US011862920B2

(12) United States Patent
Wiltraut et al.

(10) Patent No.: US 11,862,920 B2
(45) Date of Patent: Jan. 2, 2024

(54) CONTACT LOADING ASSEMBLY FOR ELECTRICAL CONNECTOR ASSEMBLING MACHINE

(71) Applicant: TE Connectivity Services GmbH, Schaffhausen (CH)

(72) Inventors: David Wiltraut, Middletown, PA (US); Jeffrey Zerbe, Bressler, PA (US); Craig Roper, Middletown, PA (US); Edward T. Price, III, Middletown, PA (US); Albert W. Wolfgang, III, Middletown, PA (US)

(73) Assignee: TE Connectivity Solutions Gmbh, Schaffhausen (CH)

( * ) Notice: Subject to any disclaimer, the term of this patent is extended or adjusted under 35 U.S.C. 154(b) by 136 days.

(21) Appl. No.: 17/388,765

(22) Filed: Jul. 29, 2021

(65) Prior Publication Data

US 2023/0034277 A1 Feb. 2, 2023

(51) Int. Cl.
*H01R 43/16* (2006.01)
*H01R 43/28* (2006.01)

(52) U.S. Cl.
CPC ............. *H01R 43/16* (2013.01); *H01R 43/28* (2013.01); *Y10T 29/49204* (2015.01)

(58) Field of Classification Search
CPC ...... H01R 43/28; H01R 43/16; H01R 43/055; H01R 13/025; H01R 43/052; H01R 12/515; Y10T 29/5193; Y10T 29/49162; Y10T 29/49204; Y10T 29/53213
USPC .................. 29/874, 842, 846, 876, 881, 884
See application file for complete search history.

(56) References Cited

U.S. PATENT DOCUMENTS 5,443,400 A * 8/1995 Brown ................. H01R 25/003 439/652
7,134,197 B2 * 11/2006 Shiffer .............. H01L 21/67005 428/209

* cited by examiner

*Primary Examiner* — Thiem D Phan

(57) ABSTRACT

An electrical connector assembling machine includes a connector strip feed unit including a feeding device configured to index the connector strip through a feed track in successive feed strokes and a contact loading assembly loading contacts into the connector strip. The contact loading assembly includes a wire distribution unit and a wire feed unit having a feeding device configured to simultaneously index wires through feed tracks in successive feed strokes. The wire feed unit includes a wire guide assembly guiding the wires through the wire feed unit. The contact loading assembly includes a contact forming unit and a contact loading device loading the contacts made from the wires into the connector strip as the connector strip is advanced through the electrical connector assembling machine.

27 Claims, 12 Drawing Sheets

CONTACT LOADING ASSEMBLY FOR ELECTRICAL CONNECTOR ASSEMBLING MACHINE

BACKGROUND OF THE INVENTION

The subject matter herein relates generally to machines for manufacturing electrical connectors.

Machines are known for assembling electrical connectors. For example, some known machines are used to load contacts into a connector housing. Manufacture and assembly of individual connectors is time consuming and expensive. For example, individually loading the contacts into the connector housing is time consuming. Conventional machines are typically designed to manufacture one particular electrical connector arrangement. Changeover of the machine to manufacture a different type of electrical connector is time consuming and involves replacement of many components of the machine.

A need remains for a machine for efficiently and reliably manufacturing electrical connectors.

BRIEF DESCRIPTION OF THE INVENTION

In one embodiment, an electrical connector assembling machine for assembling an electrical connector including a connector housing manufactured from a connector strip that is a continuous extruded dielectric material and contacts manufactured from continuous wires is provided. The electrical connector assembling machine includes a connector strip feed unit including a connector strip feed track receiving the connector strip. The connector strip feed unit includes a connector strip feeding device configured to index the connector strip through the connector strip feed track in successive feed strokes. The electrical connector assembling machine includes a contact loading assembly adjacent the connector strip feed track to load contacts in the connector strip. The contact loading assembly includes a wire distribution unit including reel cradles for holding reels of the wires. The contact loading assembly includes a wire feed unit including feed tracks receiving the wires from the reels at the wire distribution unit. The wire feed unit includes a feeding device configured to simultaneously index the wires through the corresponding feed tracks in successive feed strokes. The feeding device includes a holding device and an indexing device movable relative to the holding device to move the wires. The feeding device includes an indexer operably coupled to the indexing device. The indexer moving the indexing device relative to the holding device from a retracted position to an advanced position. The indexing device moving the wires as the indexing device is moved from the retracted position to the advanced position. The indexing device moving relative to the wires as the indexing device is returned from the advanced position to the retracted position. The wire feed unit includes a wire guide assembly guiding the wires through the wire feed unit. The wire guide assembly includes a rear guide member and a front guide member adjacent the rear guide member. The rear and front guide members is overlapping to form wire channels receiving the corresponding wires. The wire channels forming part of the feed tracks, at least one of the rear guide member and the front guide member is movable relative to the wires as the feeding device indexes the wires through the wire feed unit. The contact loading assembly includes a contact forming unit receiving the wires from the wire feed unit. The contact forming unit has a forming die pressed into the wires to form tapered ends of the contacts from the wires. The contact forming unit has a wire cutter for separating the contacts from the wires. The contact loading assembly includes a first wire clamp coupled to the holding device and positioned adjacent the contact forming die. The first wire clamp has wire channels receiving the corresponding wires. The first wire clamp has support surfaces defining the wire channels. The support surfaces engaging the wires at supported segments of the wires to resist shape changes of the wires at the supported segments when the forming die presses the wires to form the tapered ends of the contacts from the wires. The contact loading assembly includes a second wire clamp coupled to the indexing device and positioned adjacent the contact forming die. The second wire clamp has wire channels receiving the corresponding wires. The second wire clamp has support surfaces defining the wire channels. The support surfaces engaging the wires at supported segments of the wires to resist shape changes of the wires at the supported segments when the forming die presses the wires to form the tapered ends of the contacts from the wires. The contact loading assembly includes a contact loading device loading the contacts made from the wires into the connector strip as the connector strip is advanced through the electrical connector assembling machine.

In a further embodiment, an electrical connector assembling machine for assembling an electrical connector is provided and includes a connector housing manufactured from a connector strip that is a continuous extruded dielectric material and contacts manufactured from continuous wires. The electrical connector assembling machine includes a connector strip feed unit including a connector strip feed track receiving the connector strip. The connector strip feed unit includes a connector strip feeding device configured to index the connector strip through the connector strip feed track in successive feed strokes. The electrical connector assembling machine includes a contact loading assembly adjacent the connector strip feed track to load contacts in the connector strip. The contact loading assembly includes a wire distribution unit including reel cradles for holding reels of the wires. The contact loading assembly includes a wire feed unit including feed tracks receiving the wires from the reels at the wire distribution unit. The wire feed unit includes a feeding device configured to simultaneously index the wires through the corresponding feed tracks in successive feed strokes. The feeding device includes a holding device has a holding wire clamp and an indexing device has an indexing wire clamp. The feeding device includes an indexer operably coupled to the indexing device. The indexer moving the indexing device relative to the holding device from a retracted position to an advanced position. The indexing device moving the wires as the indexing device is moved from the retracted position to the advanced position. The indexing device moving relative to the wires as the indexing device is returned from the advanced position to the retracted position. The contact loading assembly includes a contact forming unit receiving the wires from the wire feed unit. The contact forming unit has a forming die for forming ends of the contacts from the wires and a wire cutter for separating the contacts from the wires. The contact loading assembly includes a contact loading device loading the contacts made from the wires into the connector strip as the connector strip is advanced through the electrical connector assembling machine.

In another embodiment, an electrical connector assembling machine for assembling an electrical connector is provided and includes a connector housing manufactured from a connector strip that is a continuous extruded dielectric material and contacts manufactured from continuous wires. The electrical connector assembling machine includes a connector strip feed unit including a connector strip feed track receiving the connector strip. The connector strip feed unit includes a connector strip feeding device configured to index the connector strip through the connector strip feed track in successive feed strokes. The electrical connector assembling machine includes a contact loading assembly adjacent the connector strip feed track to load contacts in the connector strip. The contact loading assembly includes a wire distribution unit including reel cradles for holding reels of the wires. The contact loading assembly includes a wire feed unit including feed tracks receiving the wires from the reels at the wire distribution unit. The wire feed unit includes a feeding device configured to simultaneously index the wires through the corresponding feed tracks in successive feed strokes. The contact loading assembly includes a contact forming unit receiving the wires from the wire feed unit. The contact forming unit has a forming die pressed into the wires to form tapered ends of the contacts from the wires. The contact forming unit has a wire cutter for separating the contacts from the wires. The contact loading assembly includes a wire clamp positioned adjacent the contact forming die. The wire clamp has wire channels receiving the corresponding wires. The wire clamp has support surfaces defining the wire channels. The support surfaces engaging the wires at supported segments of the wires to resist shape changes of the wires at the supported segments when the forming die presses the wires to form the tapered ends of the contacts from the wires. The contact loading assembly includes a contact loading device loading the contacts made from the wires into the connector strip as the connector strip is advanced through the electrical connector assembling machine.

In a further embodiment, an electrical connector assembling machine for assembling an electrical connector is provided and includes a connector housing manufactured from a connector strip that is a continuous extruded dielectric material and contacts manufactured from continuous wires. The electrical connector assembling machine includes a connector strip feed unit including a connector strip feed track receiving the connector strip. The connector strip feed unit includes a connector strip feeding device configured to index the connector strip through the connector strip feed track in successive feed strokes. The electrical connector assembling machine includes a contact loading assembly adjacent the connector strip feed track to load contacts in the connector strip. The contact loading assembly includes a wire distribution unit includes reel cradles for holding reels of the wires. The contact loading assembly includes a wire feed unit including feed tracks receiving the wires from the reels at the wire distribution unit. The wire feed unit includes a feeding device configured to simultaneously index the wires through the corresponding feed tracks in successive feed strokes. The wire feed unit includes a wire guide assembly guiding the wires through the wire feed unit. The wire guide assembly includes a rear guide member and a front guide member adjacent the rear guide member. The rear and front guide members is overlapping to form wire channels receiving the corresponding wires, at least one of the rear guide member and the front guide member is movable relative to the wires as the feeding device indexes the wires through the wire feed unit. The contact loading assembly includes a contact forming unit receiving the wires from the wire feed unit. The contact forming unit has a forming die pressed into the wires to form tapered ends of the contacts from the wires. The contact forming unit has a wire cutter for separating the contacts from the wires. The contact loading assembly includes a contact loading device loading the contacts made from the wires into the connector strip as the connector strip is advanced through the electrical connector assembling machine.

DETAILED DESCRIPTION OF THE INVENTION

Figure 1:
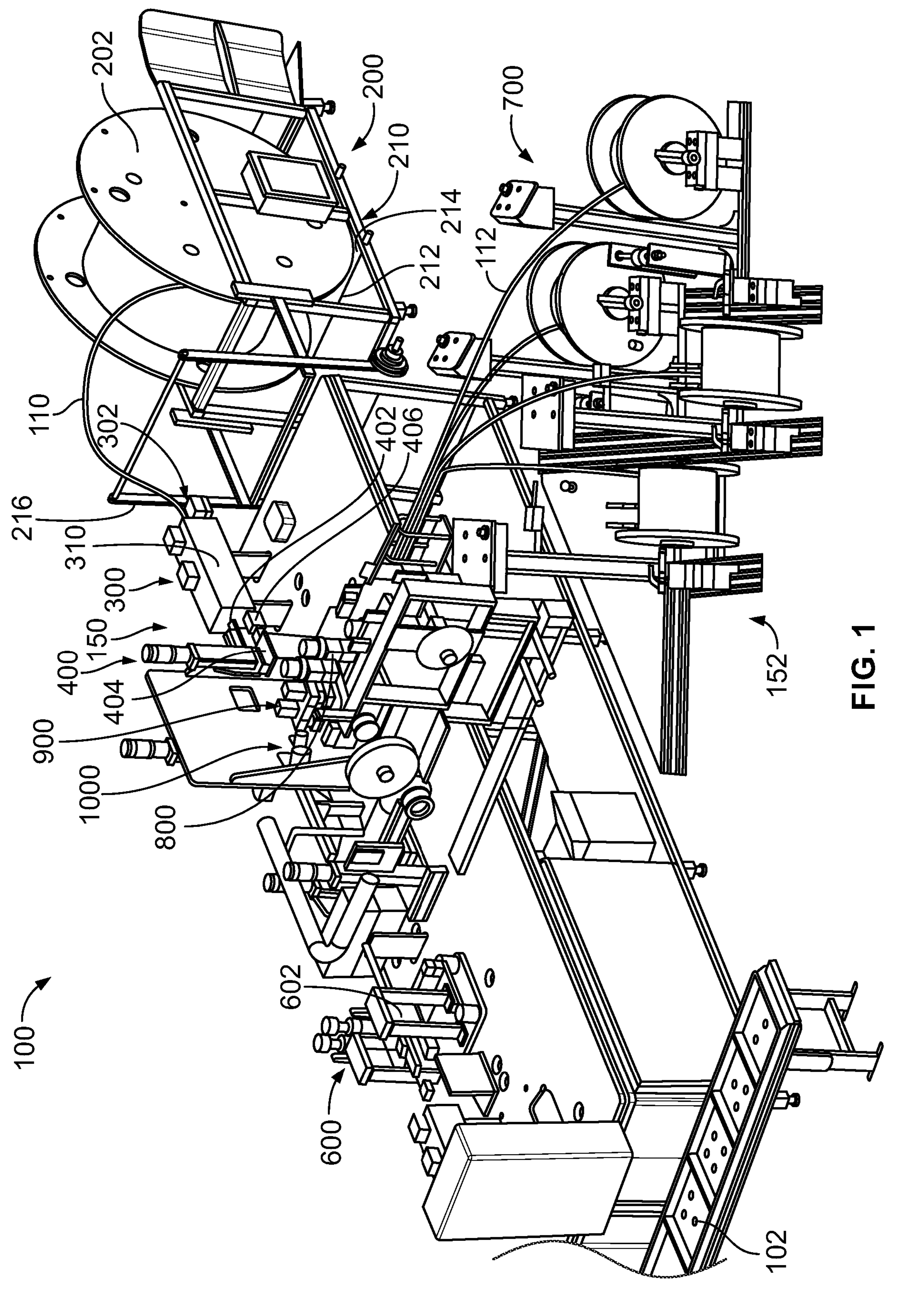
FIG. 1 illustrates an electrical connector assembling machine in accordance with an exemplary embodiment.

FIG. 1 illustrates an electrical connector assembling machine 100 in accordance with an exemplary embodiment. The electrical connector assembling machine 100 is used for assembling electrical connectors 102 (further shown in FIGS. 2-6). For example, the electrical connector assembling machine 100 is used for forming connector housings 104 from a connector strip 110, which is a continuous extruded dielectric material connector strip. The electrical connector assembling machine 100 is used for forming contacts 106 manufactured from continuous wires 112. The electrical connector assembling machine 100 manufactures the electrical connectors 102 in a continuous, feed based manufacturing process, wherein formed electrical connectors 102 are separated from the continuous strip. The electrical connectors 102 may have various lengths to vary the number of positions or contacts within the electrical connector 102 for a particular application (for example, between 2 positions and 30 positions).

In an exemplary embodiment, the electrical connector assembling machine 100 is used for assembling mass termination assembly (MTA) electrical connectors, such as MTA 100 or MTA 156 connectors commercially available from TE Connectivity. For example, the electrical connector assembling machine 100 is used for assembling board mounted header connectors. The MTA 100 connectors have contacts in a single row on 0.100" (2.54 mm) centerline spacing between 2 and 28 positions. The MTA 156 connectors have contacts in a single row on 0.156" (3.96 mm) centerline spacing between 2 and 24 positions. The header connectors may be right angle connectors or vertical mount connectors. The header connectors may have latching features for latched coupling with the mating, receptacle connectors. The header connectors may have polarizing features, such as notches, for keyed mating with the receptacle connectors. The header connectors may have different colors (for example, MTA 100 vs MTA 156). The header connectors may have the contacts with different plating to offer solutions for a multitude of diverse applications.

The electrical connector assembling machine 100 includes a connector loading assembly 150 for supplying the connector housings 104 and a contact loading assembly 152 for supplying the contacts 106. The connector loading assembly 150 and the contact loading assembly 152 operate synchronously to manufacture the electrical connectors 102. The connector loading assembly 150 of the electrical connector assembling machine 100 includes a connector strip distribution unit 200, a connector strip feed unit 300 and a connector strip notching unit 400. The electrical connector assembling machine 100 may further include an electrical connector separating unit 600. The connector strip distribution unit 200 is used to distribute the connector strip 110 to the machine 100. The connector strip feed unit 300 is used to feed the connector strip 110 through the machine 100. The connector strip notching unit 400 is used to process the connector strip 110 during a manufacturing process. The contact loading assembly 152 is used to feed the wires 112 through the machine 100. The electrical connector separating unit 600 is used to separate the assembled electrical connectors 102 from the strip. The electrical connector assembling machine 100 may include additional units in alternative embodiments for performing additional manufacturing processes.

The connector strip distribution unit 200 includes a reel cradle 210 for holding a reel 202 of the connector strip 110. The connector strip distribution unit 200 is used to unwind the connector strip 110 from the reel 202. In an exemplary embodiment, the connector strip distribution unit 200 includes a roller 212 for rotating the reel 202 of the connector strip 110 to unwind the connector strip 110 from the reel 202. The roller 212 automatically unwinds the connector strip 110 from the reel 202, such as to provide a slack length of the connector strip 110, which may be easily feed through the machine 100 without pulling the connector strip 110 tight at the reel 202. The roller 212 may be a powered roller that is rotated by an electric motor to unwind the reel 202. The roller 212 unwinds the connector strip 110 independent of the connector strip feed unit 300. For example, the connector strip feed unit 300 does not need to pull the connector strip 110 off of the reel 202. Rather, the connector strip 110 may be fed from the slack length that is unwound from the reel 202 by the roller 212.

In an exemplary embodiment, the connector strip distribution unit 200 includes a roller actuator 214 operably coupled to the roller 212 to rotate the roller 212. The roller actuator 214 may be a motor or other device used to rotate the roller 212, which in turn rotates the reel 202 to unwind the connector strip 110 from the reel 202. In an exemplary embodiment, the connector strip distribution unit 200 includes a roller trigger 216 operably coupled to the roller actuator 214 to activate the roller actuator 214 and cause the roller actuator 214 to rotate the roller 212.

In an exemplary embodiment, the connector strip feed unit 300 includes a feed track 302 receiving and guiding the connector strip 110 through the machine 100. The connector strip feed unit 300 includes a feeding device 310 configured to index the connector strip 110 through the feed track 302 in successive feed strokes. For example, the feeding device 310 may feed a defined length of the connector strip 110 for each feed stroke. In an exemplary embodiment, the feeding device 310 feeds the same length of connector strip 110 for each feed stroke. In various embodiments, the feeding device 310 may feed a length of the connector strip 110 corresponding to four contact positions or a four position connector length. For example, the feeding device 310 may feed 0.400" (10.16 mm) (for example, when manufacturing MTA 100 connectors) or 0.624" (15.84 mm) (for example, when manufacturing MTA 156 connectors).

In an exemplary embodiment, the connector strip notching unit 400 including a notching device 402 configured to cut notches in the connector strip 110 at designated locations. For example, the notches may be provided at ends of the connector housings 104 formed from the connector strip 110. The locations of the notches may be varied depending on the length of the connector housings 104 (for example, based on the number of contact positions of the electrical connector 102 being manufactured). In an exemplary embodiment, the notching device 402 includes a plurality of cutters 404 for selectively cutting through the dielectric material of the connector strip 110. The connector strip notching unit 400 includes a notching unit controller 406 operably coupled to the plurality of cutters 404 to selectively operate or actuate the cutters 404 as the connector strip 110 is indexed through the machine 100.

In an exemplary embodiment, the contact loading assembly 152 loads the contacts 106 into the connector strip 110 as the connector strip 110 is advanced through the electrical connector assembling machine 100. The contact loading assembly 152 may be used to simultaneously load multiple contacts 106 into the connector strip 110. For example, the connector strip 110 may remain at a fixed location for a period of time, during which the multiple contacts 106 are loaded into the connector strip 110, and then the connector strip 110 may be advanced during a feed stroke where another set of the contacts 106 may again be loaded into the connector strip 110. In various embodiments, four contacts 106 may be loaded into corresponding positions in the connector strip 110 during each feed stroke.

In an exemplary embodiment, the contact loading assembly 152 includes a wire distribution unit 700, a wire feed unit 800, a contact forming unit 900, and a contact loading device 1000. The wire distribution unit 700 is used to distribute the one or more of the wires 112 to the machine 100. In an exemplary embodiment, multiple wires 112 are simultaneously used to form contacts. For example, four different wires may be used for forming four contacts, which are simultaneously loaded into the connector strip 110. The wire feed unit 800 is used to feed the wires 112 through the machine 100. The contact forming unit 900 is used to process the wires 112 to form separate contacts 106 from the wires 112 during a manufacturing process. The contact loading device 1000 is used to load the contacts 106 into the connector strip 110. The electrical connector assembling machine 100 may include additional units in alternative embodiments for performing additional manufacturing processes.

In an exemplary embodiment, the electrical connector separating unit 600 is located downstream of the contact loading assembly 152. The electrical connector separating unit 600 includes a cutting device 602 for separating the electrical connectors 102, with the contacts 106 in the connector housing 104, from the connector strip 110 as the connector strip 110 is advanced through the electrical connector assembling machine 100. After the contacts 106 are loaded into the connector strip 110, the loaded connector housings 104 are separated from the connector strip 110 to form the electrical connector 102. The length of the connector housings 104 may be varied to vary the number of contacts 106 included in the electrical connector 102. For example, the machine 100 may manufacture short electrical connectors (for example, 2 or 4 position connectors), medium electrical connectors (for example, 10 or 15 position electrical connectors) or long electrical connectors (for example, 20 or 28 position electrical connectors). The machine may be used to make any reasonable length electrical connectors (for example, greater than 28 positions). The electrical connector separating unit 600 includes a cutting device 602 for separating the electrical connectors 102 from the connector strip 110.

Figure 2:
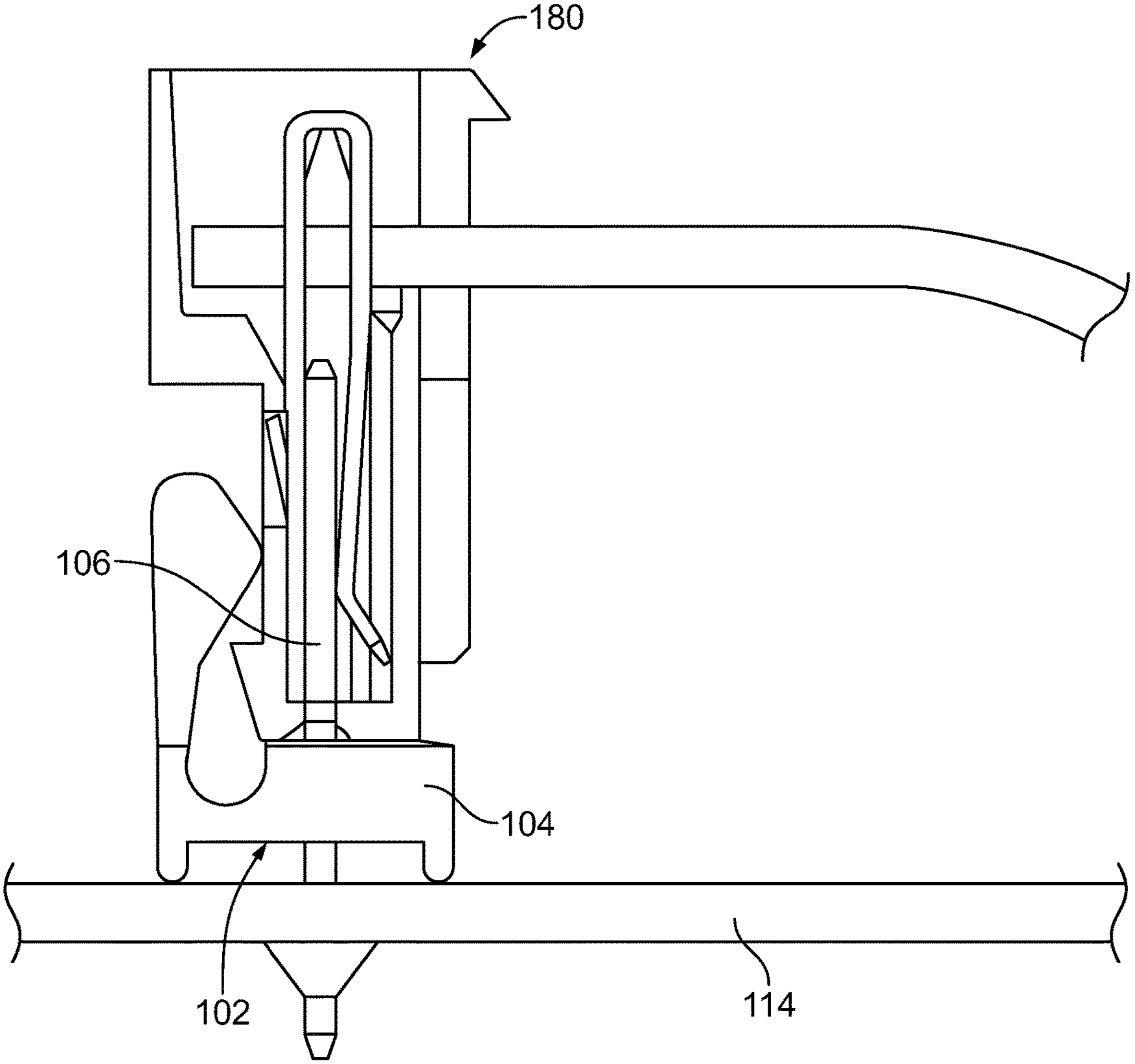
FIG. 2 is a cross sectional view of the electrical connector manufactured by the electrical connector assembling machine (FIG. 1) in accordance with an exemplary embodiment.

FIG. 2 is a cross sectional view of the electrical connector 102 manufactured by the electrical connector assembling machine 100 (FIG. 1) in accordance with an exemplary embodiment. The electrical connector 102 includes the connector housing 104 and the contact(s) 106 received in the connector housing 104. Any number of the contacts 106 may be received in the connector housing 104 (for example, between 2 and 28 contacts). The electrical connector 102 is a header connector mounted to a printed circuit board 114. The contacts 106 may be soldered to the printed circuit board 114.

A receptacle connector 180 is shown coupled to the electrical connector 102. The electrical connector 102 is a vertical connector mated with the receptacle connector 180 in a vertical direction (for example, downward) in a direction perpendicular to the printed circuit board 114. In alternative embodiments, the electrical connector 102 may be a right angle header connector configured to be mated with the receptacle connector 180 in a mating direction parallel to the printed circuit board 114.

Figure 3:
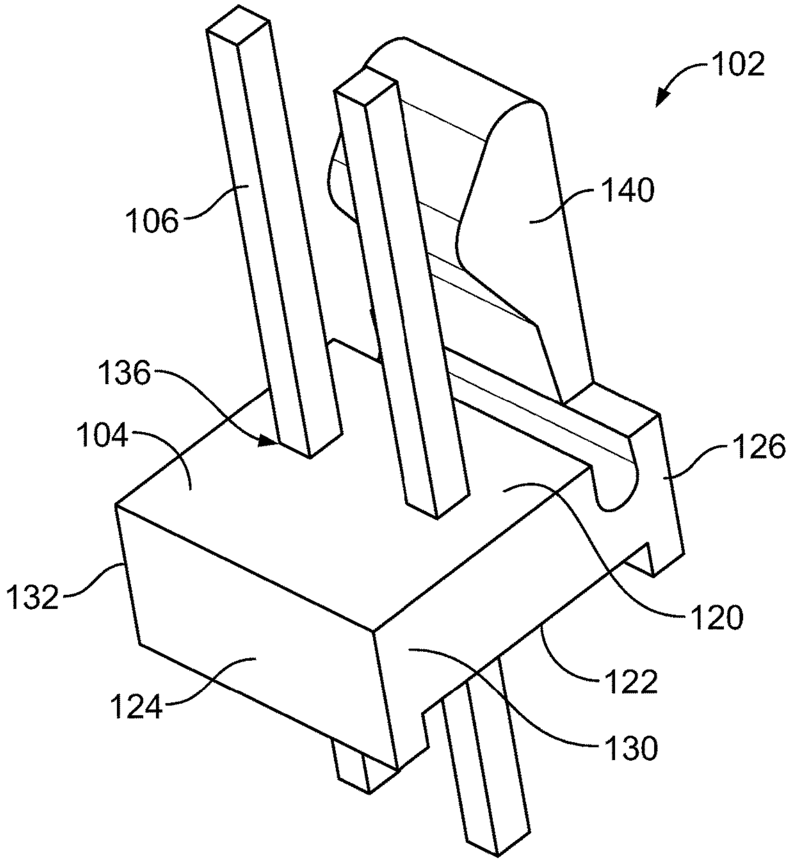
FIG. 3 is a perspective view of the electrical connector in accordance with an exemplary embodiment.

FIG. 3 is a perspective view of the electrical connector 102 in accordance with an exemplary embodiment. The electrical connector 102 is manufactured by the electrical connector assembling machine 100 (FIG. 1). For example, the electrical connector assembling machine 100 is used to manufacture the contacts 106 from the wires 112 and load the contacts 106 into the continuous strip of material defining the connector housing 104. The connector housings 104 with the contacts 106 therein are then separated from the continuous strip to form the electrical connectors 102. FIG. 3 shows the electrical connector 102 as a two position electrical connector; however, the electrical connectors 102 may be made in various lengths to vary the number of contacts 106 in the electrical connector 102 (for example, any length between 2 positions and 28 positions).

The connector housing 104 is made from the connector strip 110 (shown in FIG. 1), which is a continuous extruded dielectric material that is formed into a predetermined shape, such as an L-shape. The connector housing 104 includes a front 120 and a rear 122 opposite the front 120. During assembly, the contacts 106 are loaded into the connector strip through the rear 122. The connector housing 104 includes a first end 124 and a second end 126 opposite the first end 124. The connector housing 104 includes a first side 130 and a second side 132 opposite the first side 130. The sides 130, 132 are cut sides formed by cutting the connector housing 104 from the connector strip 110.

In an exemplary embodiment, the connector housing 104 includes contact openings 136 therethrough that receive corresponding contacts 106. The contact openings 136 may be preformed (for example, cut or drilled) through the main body of the connector housing 104. Alternatively, the contacts 106 may be pressed through the main body of the connector housing 104 during assembly to form the contact openings 136.

In an exemplary embodiment, the connector housing 104 includes a finger 140 extending from the front 120 of the main body. In the illustrated embodiment, the finger 140 is located at the second end 126. The finger 140 is a friction lock finger in various embodiments used for securing the receptacle connector 180 (shown in FIG. 2) to the electrical connector 102. In alternative embodiments, the connector housing 104 may be manufactured without the finger 140. For example, the connector strip 110 may be extruded without the finger 140.

Figure 4:
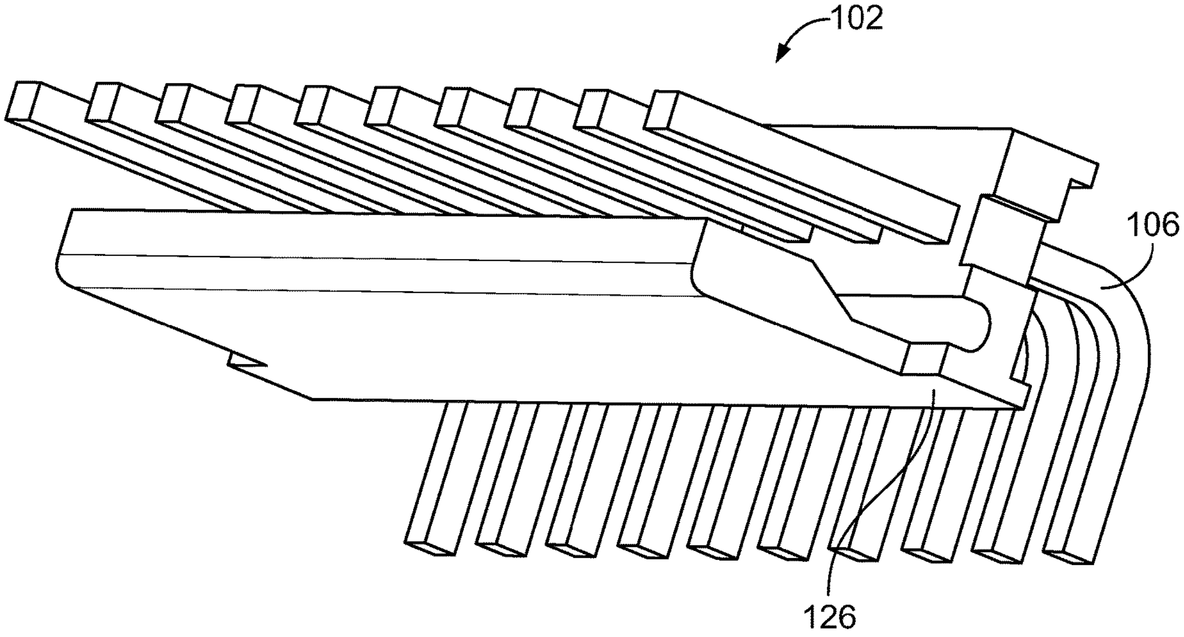
FIG. 4 is a perspective view of the electrical connector in accordance with an exemplary embodiment.

FIG. 4 is a perspective view of the electrical connector 102 in accordance with an exemplary embodiment. In the illustrated embodiment, the electrical connector 102 is a right-angle header connector. The contacts 106 are bent to include a right-angle bend. In such embodiment, the second end 126 is configured to be mounted to the printed circuit board 114 (shown in FIG. 2).

Figure 5:
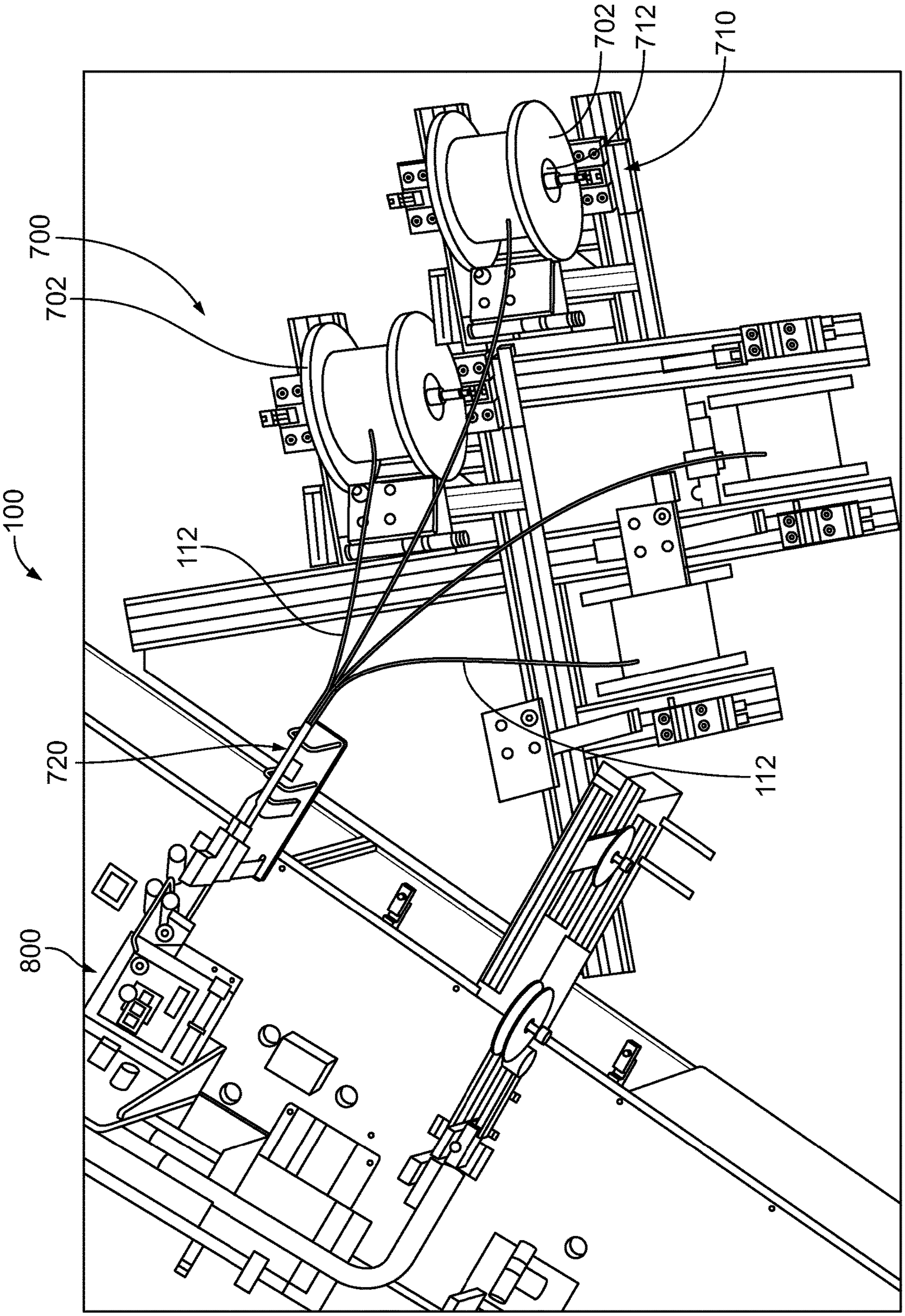
FIG. 5 is a rear perspective view of a portion of the electrical connector assembling machine showing the wire distribution unit in accordance with an exemplary embodiment.

FIG. 5 is a rear perspective view of a portion of the electrical connector assembling machine 100 showing the wire distribution unit 700. The wire distribution unit 700 includes reel cradles 710 for holding reels 702 of the wire 112. The wire distribution unit 700 is used to unwind the wires 112 from the reels 702. In an exemplary embodiment, the wire distribution unit 700 includes rollers 712 for rotating the reels 702 of the wire 112 to unwind the wire 112 from the reels 702. The rollers 712 automatically unwind the wires 112 from the reels 702. The rollers 712 may be rotated by an electric motor to unwind the reels 702.

In an exemplary embodiment, the wire distribution unit 700 includes a manifold 720 used to gather the wires 112. The manifold 720 combines the wires 112 in a consolidated area to direct the wires 112 into the wire feed unit 800. The manifold 720 may include rollers to straighten the wires 112 to remove the natural bend in the wires 112 from being wound on the reels 702.

Figure 6:
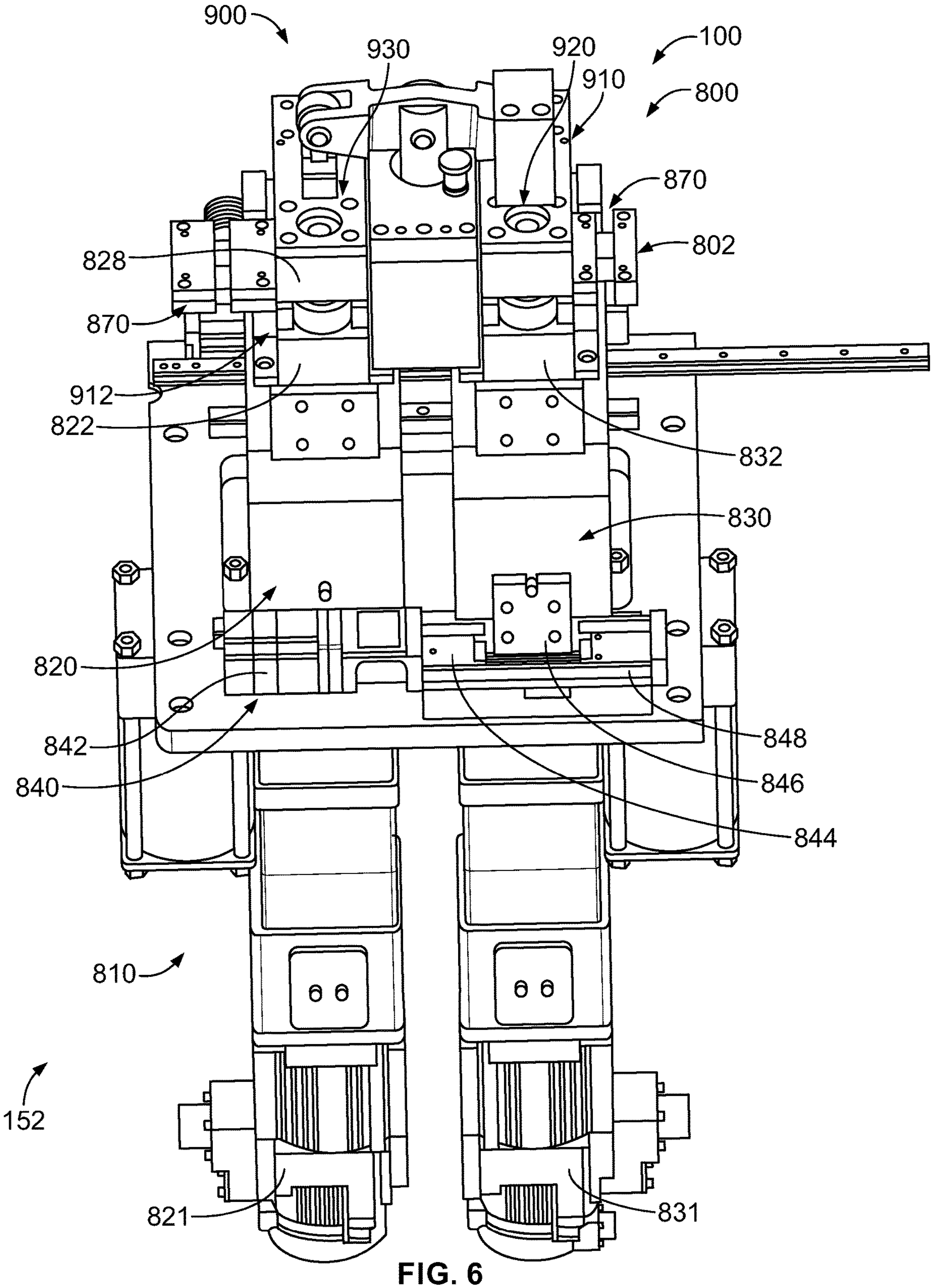
FIG. 6 is a perspective view of the wire feed unit and the contact forming unit in accordance with an exemplary embodiment.
Figure 7:
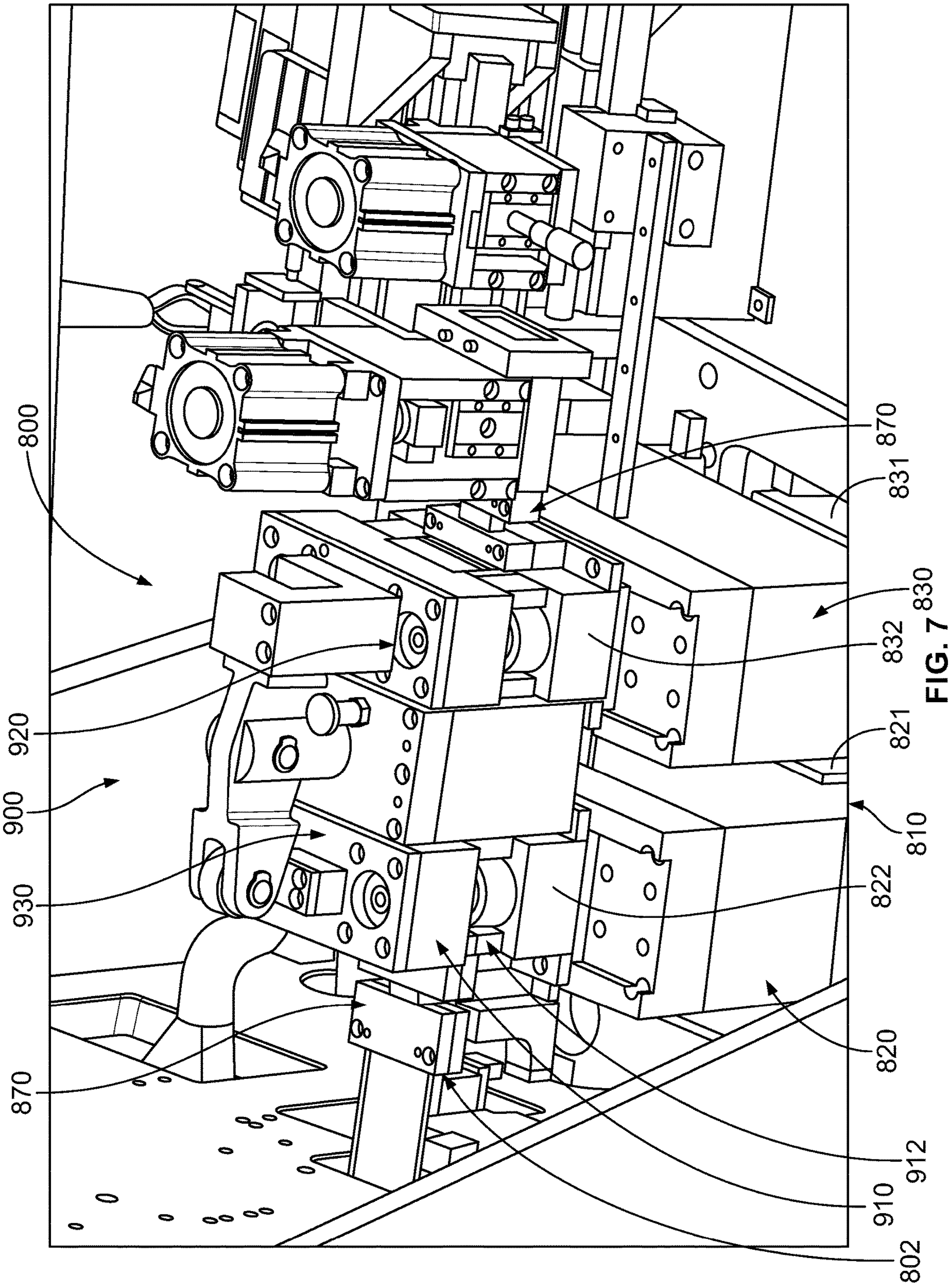
FIG. 7 is a perspective view of a portion of the wire feed unit and the contact forming unit in accordance with an exemplary embodiment.

FIG. 6 is a perspective view of the wire feed unit 800 and the contact forming unit 900 in accordance with an exemplary embodiment. FIG. 7 is a perspective view of a portion of the wire feed unit 800 and the contact forming unit 900 in accordance with an exemplary embodiment.

The wire feed unit 800 includes a feed track 802 receiving and guiding the wire 112 through the machine 100. The wire feed unit 800 includes a feeding device 810 configured to index the wires 112 through the feed track 802 in successive feed strokes. For example, the feeding device 810 may feed defined lengths of the wires 112 for each feed stroke. In an exemplary embodiment, the feeding device 810 feeds the same length of wire 112 for each feed stroke. In various embodiments, the feeding device 810 may feed four of the wires 112 through the wire feed unit 800, which are processed by the contact forming unit 900 to make four contacts 106 at a time from the four wires 112. In an exemplary embodiment, the feeding device 810 is programmable to feed different lengths of the wires 112 depending on the particular application and requirements for the electrical connector 102.

The feeding device 810 includes a holding device 820 and an indexing device 830. The indexing device 830 is movable relative to the holding device 820. The indexing device 830 is used to advance or feed the wires 112 through the contact loading assembly 152. The holding device 820 is in a fixed position relative to the frame of the electrical connector assembling machine 100. In an exemplary embodiment, the feeding device 810 includes an indexer 840 operably coupled to the indexing device 830. The indexer 840 moves the indexing device 830 relative to the fixed holding device 820 from a retracted position to an advanced position. The indexing distance of the indexing device 830 corresponds to the feed length of the wires 112 through the wire feed unit 800, which corresponds to the lengths of the contacts 106 manufactured by the machine 100. The indexing device 830 moves the wires 112 as the indexing device 830 is moved from the retracted position to the advanced position. The indexing device 830 releases the wires 112 and moves relative to the wires 112 as the indexing device 830 is returned from the advanced position to the retracted position. In alternative embodiments, a second indexer may be provided such that both the holding device 820 and the indexing device 830 may be movable relative to each other and relative to the frame.

In an exemplary embodiment, the holding device 820 includes a holding clamp 822 and a holding actuator 821 operably coupled to the holding clamp 822. The holding actuator 821 is operated to move the holding clamp 822 between a clamping position (closed) and a released position (open). In the illustrated embodiment, the holding actuator 821 is a pneumatic actuator that allows opening and closing of the holding clamp 822. However, other types of actuators may be used in alternative embodiments, such as a hydraulic actuator, an electric actuator, and the like. The holding actuator 821 includes a piston configured to be extended and retracted to move the holding clamp 822. The holding clamp 822 is used to hold or fix the wires 112 relative to the holding device 820 in the clamping position. For example, the wires 112 may be captured between the holding clamp 822 and another structure, such as a clamping wall. In various embodiments, the clamping wall may be positioned below the wires 112 and the holding clamp 822 is moved downward to the clamping position to capture the wires 112 between the holding clamp 822 and the clamping wall. The holding actuator 821 moves the holding clamp 822 toward and away from the clamping wall 828 during operation. The holding clamp 822 is released from the wires 112 in the released position and the wires 112 is allowed to move relative to the holding clamp 822 in the released position. In an exemplary embodiment, the holding clamp 822 includes slots or channels that define portions of the feed track 802.

In an exemplary embodiment, the indexing device 830 includes an indexing clamp 832 and an indexing actuator 831 operably coupled to the indexing clamp 832. The indexing actuator 831 is operated to move the indexing clamp 832 between a clamping position (closed) and a released position (open). In the illustrated embodiment, the indexing actuator 831 is a pneumatic actuator that allows opening and closing of the indexing clamp 832. However, other types of actuators may be used in alternative embodiments, such as a hydraulic actuator, an electric actuator, and the like. The indexing actuator 831 includes a piston configured to be extended and retracted to move the indexing clamp 832. The indexing clamp 832 is used to hold or fix the wires 112 relative to the indexing device 830 in the clamping position. For example, the wires 112 may be captured between the indexing clamp 832 and another structure, such as a clamping wall to allow the wires 112 to move with the indexing device 830. The indexing actuator 831 moves the indexing clamp 832 toward and away from the clamping wall during operation. The indexing clamp 832 is released from the wires 112 in the released position and the wires 112 are allowed to move relative to the indexing clamp 832 in the released position. In an exemplary embodiment, the indexing clamp 832 includes slots or channels that define portions of the feed track 802.

The indexer 840 moves the indexing device 830 in a feed direction along a feed stroke to advance or feed the wire 112 through the electrical connector assembling machine 100. The indexer 840 controls the feed distance that the wires 112 are indexed through the electrical connector assembling machine 100. Optionally, the indexer 840 feeds the wires 112 in a forward feed direction.

In the illustrated embodiment, the indexer 840 includes a motor 842, a ball screw 844 driven by the motor 842, and a carriage 846 operably coupled to the ball screw 844. The carriage 846 is slidable along a feed rail 848, which controls the feed direction. The indexing device 830 is mounted to the carriage 846, such as being bolted or otherwise fastened or secured to the carriage 846. The indexing device 830 is carried by the carriage 846 and is movable with the carriage 846 as the carriage 846 slides along the feed rail 848 both in the forward advancing direction and in the rearward retracting direction. For example, the carriage 846 moves the indexing device 830 relative to the holding device 820. The motor 842 is operated to drive the ball screw 844 and move the carriage 846 in a forward direction and a reverse direction to move the indexing device 830 between the retracted position and the advanced position. The indexer 840 has controlled movement and positioning for repeatable and known positioning of the indexing device 830, and thus the wires 112, within the electrical connector assembling machine 100. The indexer 840 may be programmable to control functions of the indexer 840, such as the feed stroke length, the feed stroke speed, and the like. For example, the motor 842 of the indexer 840 may be a servo motor having computer controlled forward and reverse operation. Other types of drive mechanisms may be used in alternative embodiments.

In an exemplary embodiment, the wire feed unit 800 includes a wire guide assembly 870 used to guide the wires 112 through the wire feed unit 800. The wire guide assembly 870 may form a portion of the feed track 802. In an exemplary embodiment, the wire guide assembly 870 may provide guidance for the wires 112 in multiple directions, such as from above, below and both sides. For example, the wires 112 may be enclosed by the wire guide assembly 870. Optionally, multiple wire guide assemblies 870 may be used, such as at the entry and exit to the wire feed unit 800. The wire guide assembly 870 is used to prevent buckling of the wires 112 as the wires 112 are indexed through the wire feed unit 800. In an exemplary embodiment, the wire guide assembly 870 is flexible (for example, expands and contracts) to accommodate movement of the indexing device 830 and/or the holding device 820. For example, the wire guide assembly 870 may have multiple pieces that are coupled to different components, which are movable relative to each other. The pieces of the wire guide assembly 870 are movable relative to each other, such as sliding relative to each other.

In an exemplary embodiment, the contact forming unit 900 includes one or more forming dies 910 used to form portions of the contacts 106 from the wires 112. The forming dies 910 are pressed into the wires 112 during a pressing operation to form the wires 112. In an exemplary embodiment, the wires 112 are square wires and the forming dies 910 are used to form tapered ends at the ends of the contacts 106. For example, the forming dies 910 are used to form pyramidal sections at the ends of the contacts 106. In various embodiments, one forming die 910 may be used to form tapered sides of the contacts 106 while another forming die 910 may be used to form tapered tops and bottoms of the contacts 106.

In an exemplary embodiment, the forming dies 910 are integrated with the holding device 820 and the indexing device 830. For example, the forming dies 910 may include a first forming die 920 with the holding device 820 and a second forming die 930 with the indexing device 830. The pressing operation of the first forming die 920 is performed with the clamping operation of the holding clamp 822. For example, actuation of the holder actuator 821 drives the pressing operation of the first forming die 920. The pressing operation of the second forming die 930 is performed with the clamping operation of the indexing clamp 832. For example, actuation of the indexing actuator 831 drives the pressing operation of the first forming die 920.

In an exemplary embodiment, the contact forming unit 900 includes a wire cutter 912 for separating the contacts 106 from the wires 112. The wire cutter 912 may be integrated with one of the forming dies 910, such as the first forming die 920 or the second forming die 930. Optionally, the wire cutter 912 may be part of the forming die 910, such as at an end of the forming die 910 used to cut through the wires 112. Alternatively, a cutting element may be provided. The wire cutter 912 physically separates the contacts 106 from the wires 112 to allow the separated contacts 106 into the connector strips 110 by the contact loading device 1000.

Figure 8:
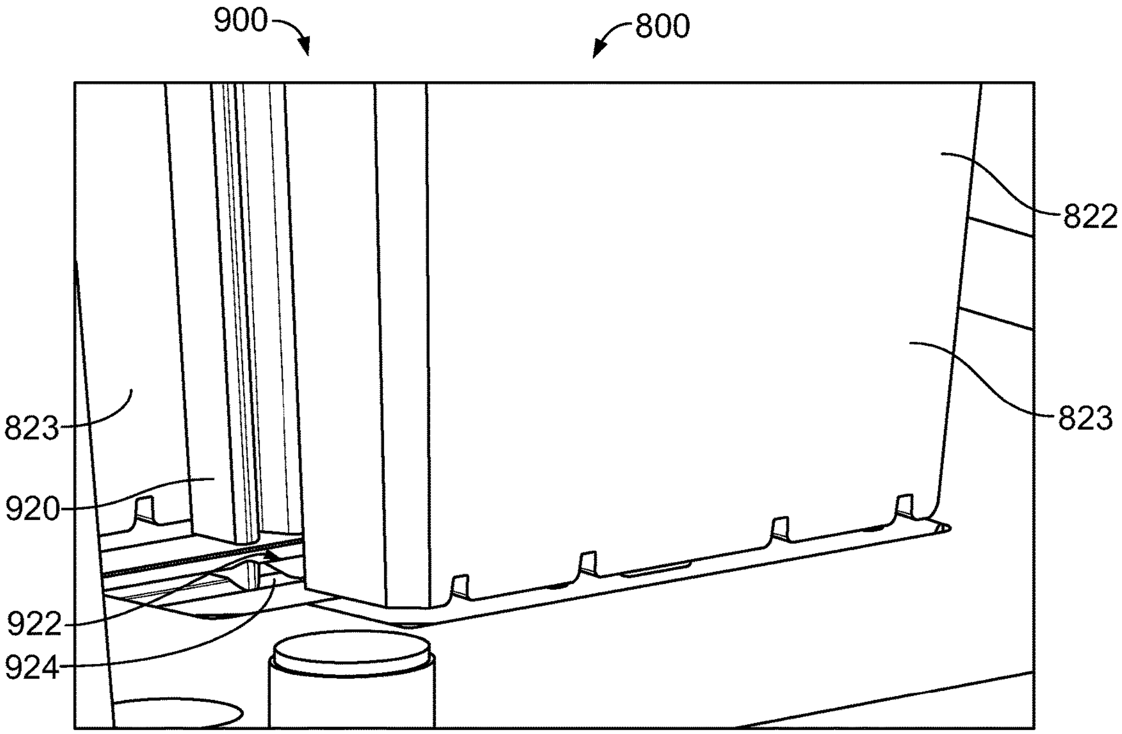
FIG. 8 illustrates a portion of the wire feed unit and the contact forming unit in accordance with an exemplary embodiment showing the holding device and the first forming die.
Figure 9:
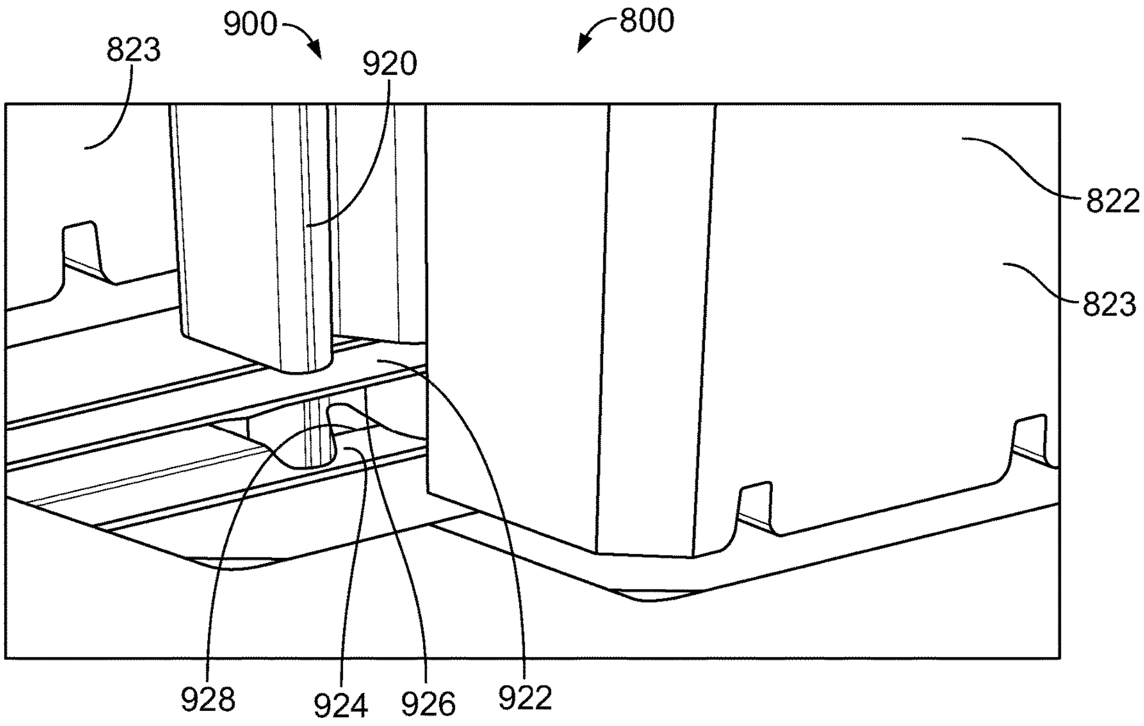
FIG. 9 is an enlarged view of the wire feed unit and the contact forming unit shown in FIG. 8 in accordance with an exemplary embodiment.

FIG. 8 illustrates a portion of the wire feed unit 800 and the contact forming unit 900 in accordance with an exemplary embodiment showing the holding device 820 and the first forming die 920. FIG. 9 is an enlarged view of the wire feed unit 800 and the contact forming unit 900 shown in FIG. 8 in accordance with an exemplary embodiment. The holding device 820 includes the first wire clamp or the holding wire clamp 822 used to hold the wires 112 during the pressing or forming process. For example, when the first forming die 920 is pressed into the wires 112 to form the ends of the contacts 106, the holding wire clamp 822 holds the wires 112 to resist longitudinal and lateral movement of the wires 112. The holding wire clamp 822 resists shape changes of the wires 112 when the forming die 920 presses the wires 112 to form the tapered ends of the contacts 106.

The first forming die 920 includes forming tools 922, 924 shaped to form tapered sections into the wires 112, which correspond to the tapered ends of the contacts 106. Optionally, the lower forming tool 924 is fixed in place and the upper forming tool 922 is movable relative to the lower forming tool 924. The upper forming tool 922 includes forming surfaces 926 forming the tops of the wires 112, whereas the lower forming tool 924 includes forming surfaces 928 forming the bottoms of the wires 112. The forming tool 922 is movable in a vertical pressing direction. For example, the forming tool 922 may be pressed downward into the wires 112 to swage and reshape the wires 112 and form the tapered sections. In an exemplary embodiment, the holding actuator 821 (shown in FIG. 6) is used to drive the forming tool 922. For example, operation of the holding actuator 821 causes the forming tool 922 to move downward in a pressing direction and to move upward in a return direction. During the downward pressing stroke, the forming tool 922 engages the wires 112 and forms the wires 112 into the desired shape between the upper and lower forming tools 922, 924.

In an exemplary embodiment, the wire cutter 912 is integrated with the first forming die 920. For example, the wire cutter 912 is movable with the upper forming tool 922 to cut through the wires 112 as the wire cutter 912 is moved in the downward direction. The wire cutter 912 is used to physically separate the contacts 106 from the wires 112.

In an exemplary embodiment, the holding wire clamp 822 includes multiple clamping elements 823. For example, clamping elements 823 may be provided on both sides of the first forming die 920 (for example, upstream and downstream). The clamping elements 823 are positioned adjacent to the forming die 920, such as in close proximity to the forming area to hold the wires 112 in position during the forming process. The clamping elements 823 support segments of the wires 112 adjacent to the segments of the wires 112 being formed (for example, the segments corresponding to the tapered ends of the contacts). The clamping elements 823 resist shape changes (for example, stretching of the material during swaging) of the wires 112 at the supported segments of the wires 112. The clamping elements 823 resist longitudinal movements of the wires 112 and resist lateral movements of the wires 112. As such, the forming die 920 is able to consistently and reliably form the tapered ends to produce high quality electrical connectors.

Figure 10:
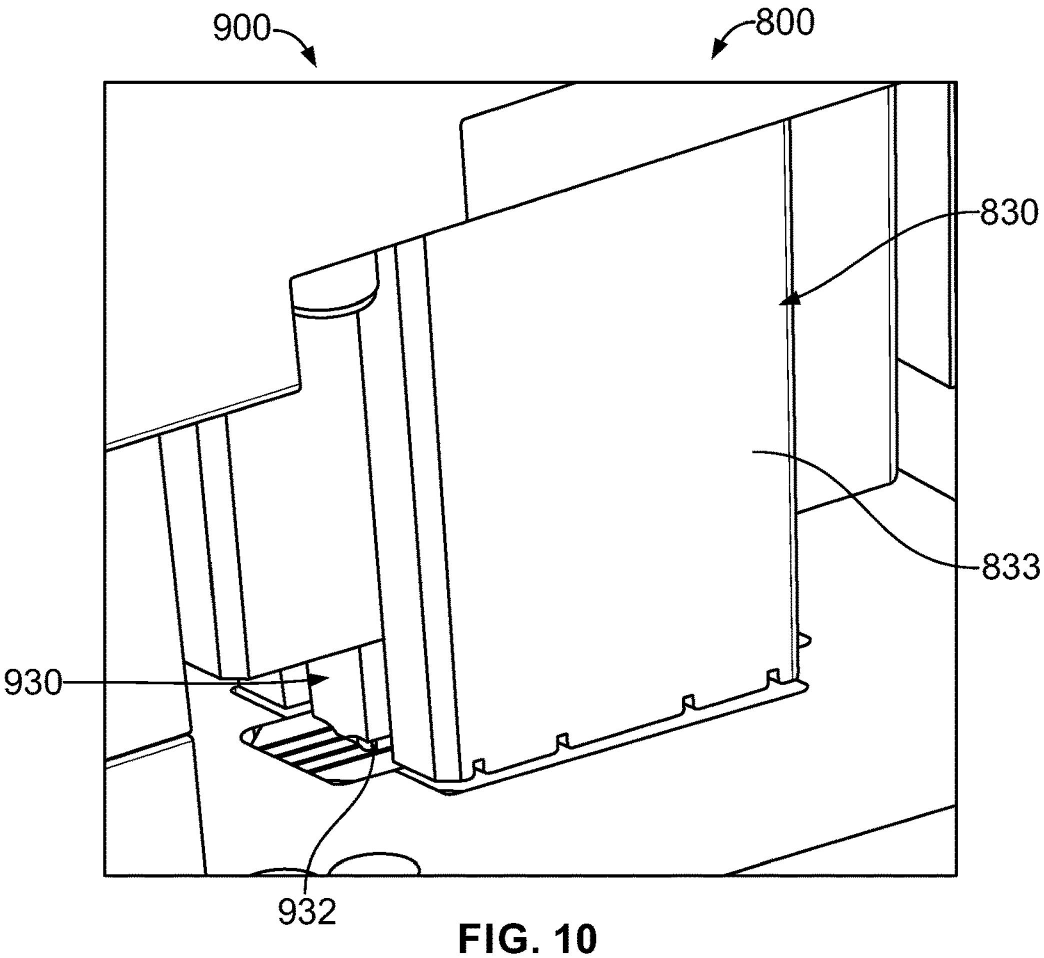
FIG. 10 illustrates a portion of the wire feed unit and the contact forming unit in accordance with an exemplary embodiment showing the indexing device and the second forming die.
Figure 11:
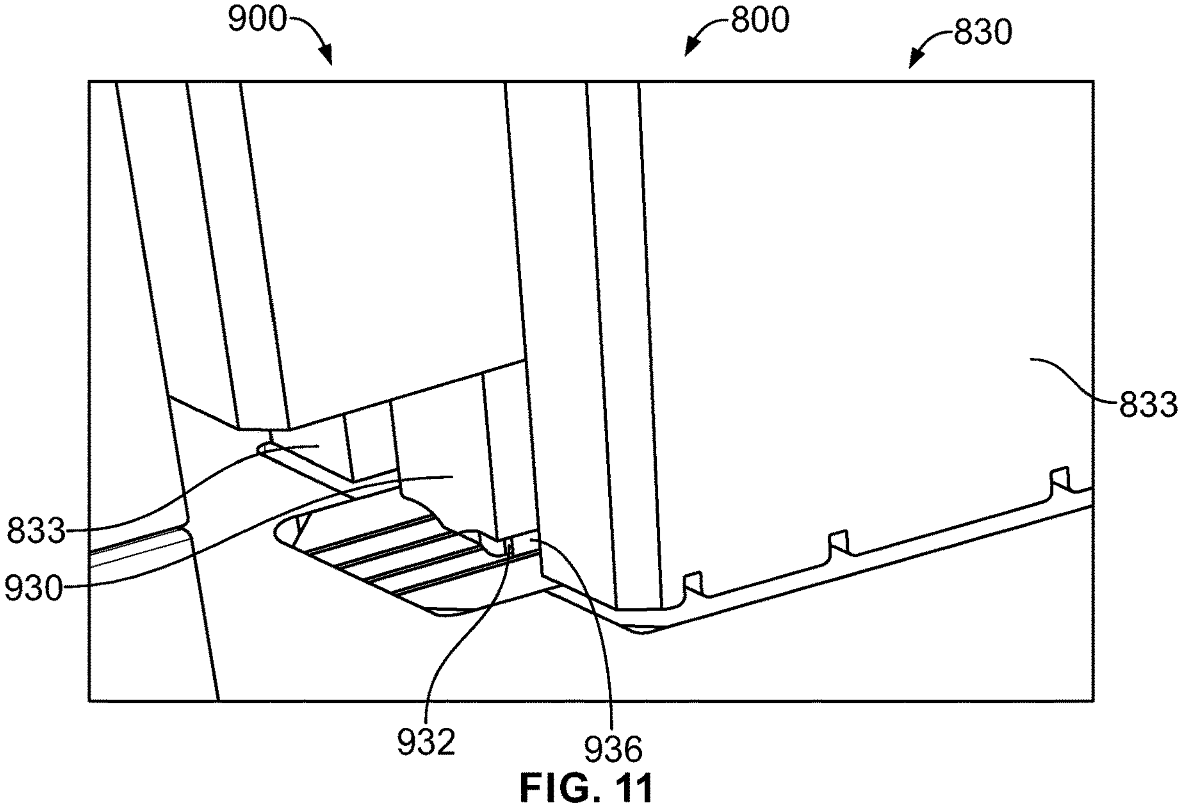
FIG. 11 is an enlarged view of the wire feed unit and the contact forming unit shown in FIG. 10 in accordance with an exemplary embodiment.

FIG. 10 illustrates a portion of the wire feed unit 800 and the contact forming unit 900 in accordance with an exemplary embodiment showing the indexing device 830 and the second forming die 930. FIG. 11 is an enlarged view of the wire feed unit 800 and the contact forming unit 900 shown in FIG. 10 in accordance with an exemplary embodiment. The indexing device 830 includes the second wire clamp or the indexing wire clamp 832 used to hold the wires 112 during the pressing or forming process. For example, when the second forming die 920 is pressed into the wires 112 to form the ends of the contacts 106, the indexing wire clamp 832 holds the wires 112 to resist longitudinal and lateral movement of the wires 112. The indexing wire clamp 832 resists shape changes of the wires 112 when the forming die 920 presses the wires 112 to form the tapered ends of the contacts 106.

The second forming die 930 includes a forming tool 932 shaped to form tapered sections into the wires 112, which correspond to the tapered ends of the contacts 106. The forming tool 932 includes forming surfaces 936 used to form the sides of the wires 112. The forming tool 932 is movable in a vertical pressing direction. For example, the forming tool 932 may be pressed downward into the wires 112 to reshape the wires 112 and form the tapered sections. In an exemplary embodiment, the indexing actuator 831 (shown in FIG. 6) is used to drive the forming tool 932. For example, operation of the indexing actuator 831 causes the forming tool 932 to move downward in a pressing direction and to move upward in a return direction. During the downward pressing stroke, the forming tool 932 engages the wires 112 and forms the wires 112 into the desired shape.

In an exemplary embodiment, the indexing wire clamp 832 includes multiple clamping elements 833. For example, clamping elements 833 may be provided on both sides of the second forming die 930 (for example, upstream and downstream). The clamping elements 833 are positioned adjacent to the forming die 930, such as in close proximity to the forming area to hold the wires 112 in position during the forming process and the contact separating process. The clamping elements 833 support segments of the wires 112 adjacent to the segments of the wires 112 being formed (for example, the segments corresponding to the tapered ends of the contacts). The clamping elements 833 resist shape changes of the wires 112 at the supported segments of the wires 112. The clamping elements 833 resist longitudinal movements of the wires 112 and resist lateral movements of the wires 112. As such, the forming die 930 is able to consistently and reliably form the tapered ends to improve the shape of the end of the contact and produce high quality contacts for the electrical connectors.

Figure 12:
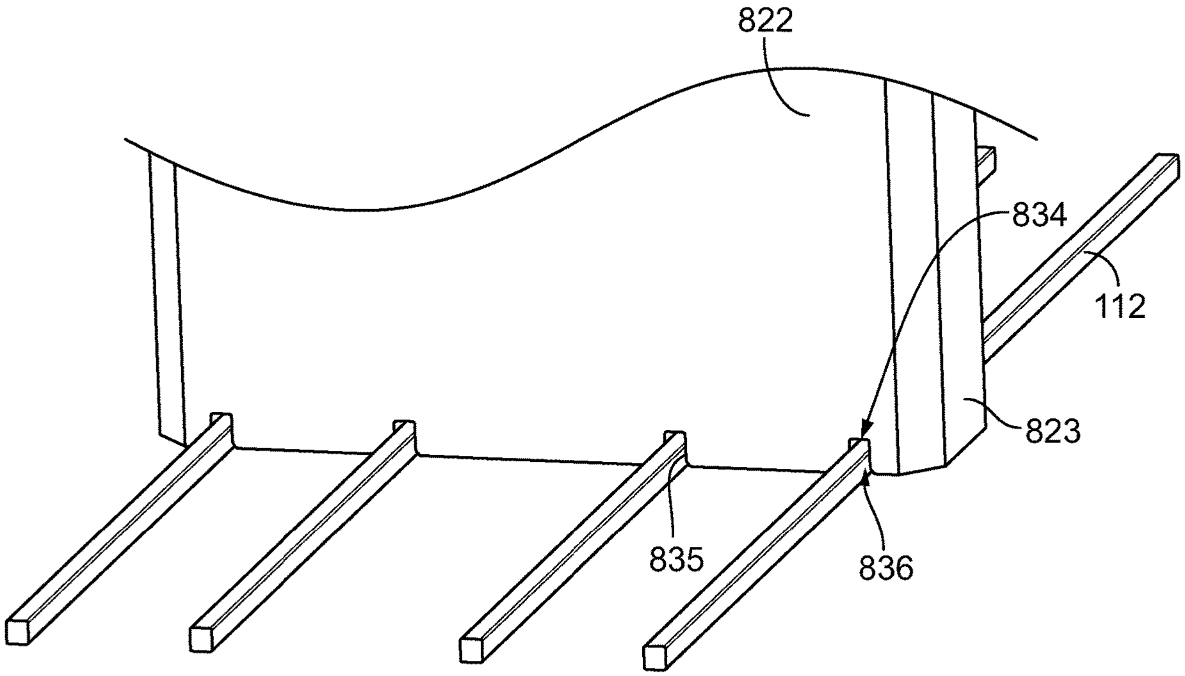
FIG. 12 is a perspective view of a portion of the wire clamp in accordance with an exemplary embodiment.
Figure 13:
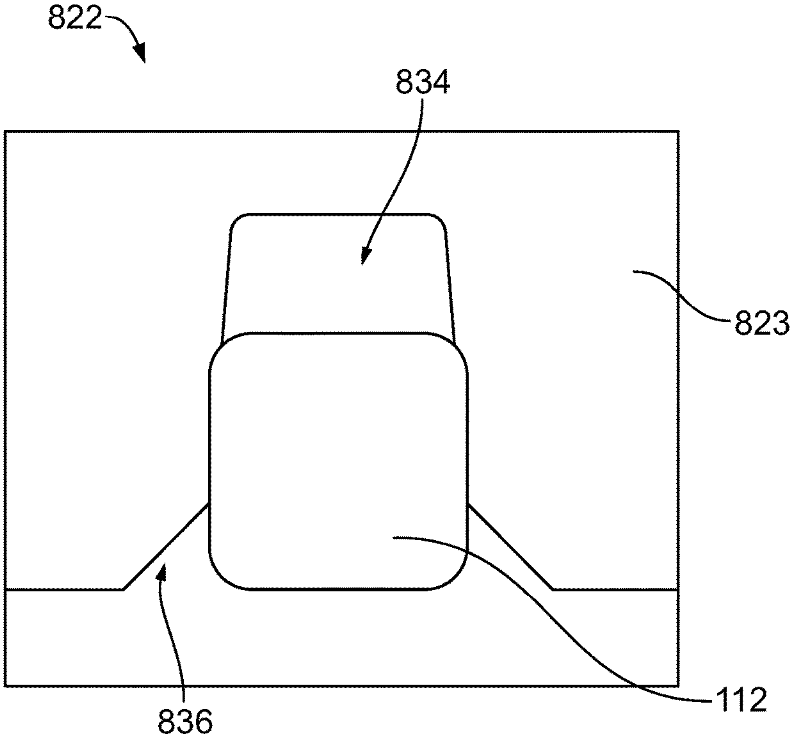
FIG. 13 is an enlarged, end view of the wire clamp in accordance with an exemplary embodiment.

FIG. 12 is a perspective view of a portion of the wire clamp 832 in accordance with an exemplary embodiment. FIG. 13 is an enlarged, end view of the wire clamp 832 in accordance with an exemplary embodiment. FIGS. 12 and 13 illustrate one of the clamping elements 833 of the wire clamp 832. It is realized that the wire clamp 822 and corresponding clamping elements 823 (shown in FIG. 8) may be similar or identical to the wire clamp 832 shown in FIGS. 12 and 13.

The wire clamp 832 includes wire channels 834 at a bottom thereof. The wires channels 834 receive corresponding wires 112. The wire clamp 832 includes support surfaces 835 defining the wire channels 834. The support surfaces 835 may be shaped to closely follow the profile of the wires 112 (for example, square-shaped wires). The support surfaces 835 may be sized to tightly receive or pinch the wires 112 to resist shape changes or other movements of the wires 112 within the wire channels 834. In the illustrated embodiment, the support surfaces 835 are angled or tapered slightly to guide loading of the wires 112 into the wire channels 834 and pinch the wires 112 when clamped. For example, the wire channels 834 may be trapezoidal shaped to receive the wires 112. In an exemplary embodiment, the wire channels 834 included lead-in surfaces 836 at the bottom of the wire clamp 832. The lead-in surfaces 836 guide the wires 112 into the wire channels 834.

Figure 14:
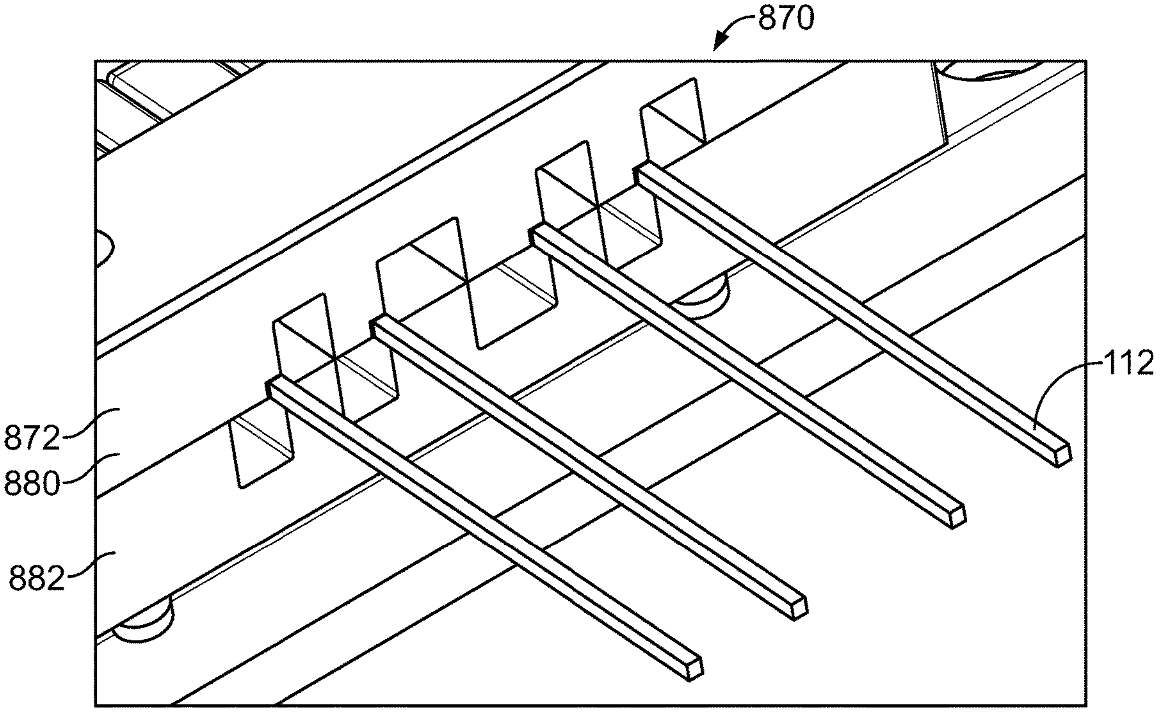
FIG. 14 illustrates the wire guide assembly in accordance with an exemplary embodiment.
Figure 15:
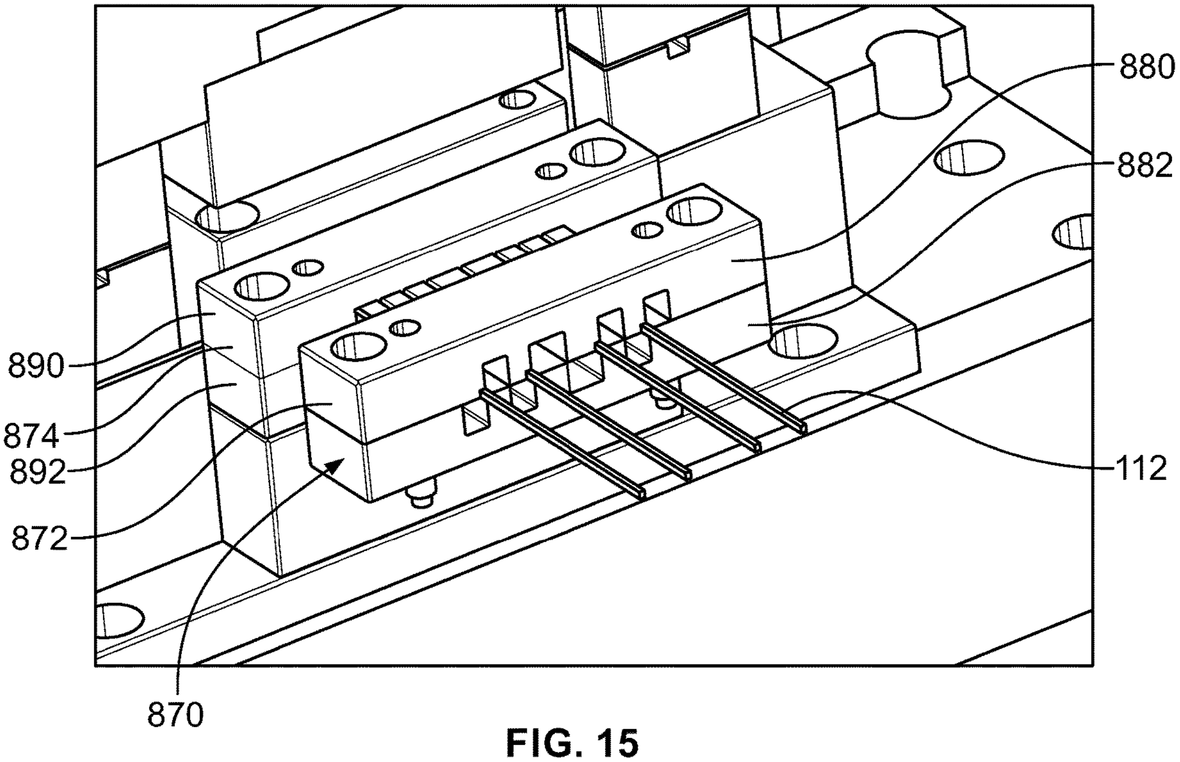
FIG. 15 is an enlarged view of a portion of the wire guide assembly in accordance with an exemplary embodiment.

FIG. 14 illustrates the wire guide assembly 870 in accordance with an exemplary embodiment. FIG. 15 is an enlarged view of a portion of the wire guide assembly 870 in accordance with an exemplary embodiment. The wire guide assembly 870 guides or positions the wires 112 as the wires 112 are indexed through the wire feed unit 800. FIGS. 14 and 15 illustrate one of the wire guide assemblies 870, such as the wire guide assembly at the exit from the wire feed unit 800; however, a similar wire guide assembly 870 may be used at the entrance to the wire feed unit 800.

The wire guide assembly 870 includes multiple pieces that are coupled to different components. The pieces are movable relative to each other, such as to slide relative to each other in a direction parallel to the wires 112. In an exemplary embodiment, the wire guide assembly 870 includes a rear guide member 872 and a front guide member 874. The guide members 872 are coupled to different components and are configured to be movable relative to each other. For example, the rear guide member 872 is coupled to the holding device 820 while the front guide member 874 is coupled to another component, such as the contact loading device 1000 (shown in FIG. 1). The holding device 820 may be movable relative to the contact loading device 1000 (for example, repositioned to control contact length), and thus the rear guide member 872 may be movable relative to the front guide member 874. The guide members 872, 874 may be secured to the respective components using fasteners, welding or other securing means. The wires 112 are indexed through the guide members 872, 874.

In an exemplary embodiment, the rear guide member 872 includes an upper rear guide element 880 and a lower rear guide element 882. The upper and lower rear guide elements 880, 882 are coupled together, such as using fasteners. Optionally, the upper and lower rear guide elements 880, 882 may be identical to each other and inverted 180° relative to each other. In an exemplary embodiment, the front guide member 874 includes an upper front guide element 890 and a lower front guide element 892. The upper and lower front guide elements 890, 892 are coupled together, such as using fasteners. Optionally, the upper and lower front guide elements 890, 892 may be identical to each other and inverted 180° relative to each other. In various embodiments, the upper and lower front guide elements 890, 892 may be identical to the upper and lower rear guide elements 880, 882 and rotated 180° relative to each other.

Figure 16:
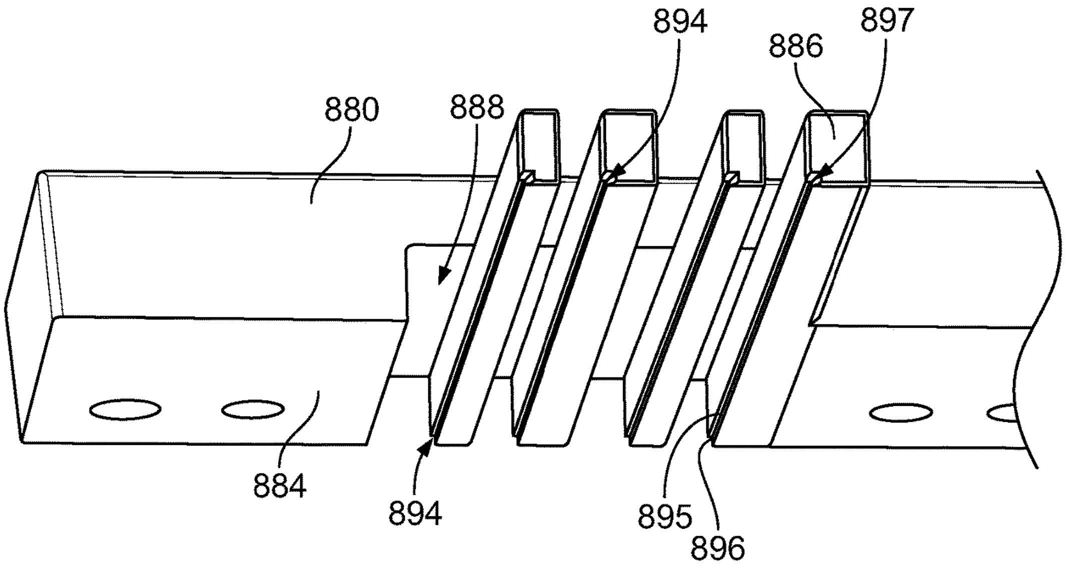
FIG. 16 is a perspective view of a portion of the wire guide assembly, illustrating the upper rear guide element in accordance with an exemplary embodiment.

FIG. 16 is a perspective view of a portion of the wire guide assembly 870, illustrating the upper rear guide element 880. In various embodiments, the lower rear guide element 882, and the upper and lower front guide elements 890, 892 may be identical to the upper rear guide element 880 and like components are identified with like reference numerals. The guide element 880 includes a base block 884 and rails 886 extending from the base block 884. The base block 884 includes slots 888 extending therethrough offset relative to the rails 886. The rails 886 may have different sizes. The slots 888 may have different sizes. The slots 888 are sized to receive rails of another guide element (for example, the slots 888 of the upper rear guide element are configured to receive rails of the upper front guide element 890, whereas the slots of the upper front guide element 890 are configured to receive the rails 886 of the upper rear guide element 880).

The rails 886 include wire channels 894, which receive portions of the wires 112. The rails 886 have horizontal surfaces 895 and vertical surfaces 896 that meet at a corner, which form the wire channels 894. The wire channels 894 extend the length of the rails 886. In an exemplary embodiment, the wire channels 894 receive a corresponding corner of the square-shaped wire 112. In an exemplary embodiment, the wire channels 894 have lead-in surfaces 897 to guide the wires 112 into or out of the wire channels 894.

Figure 17:
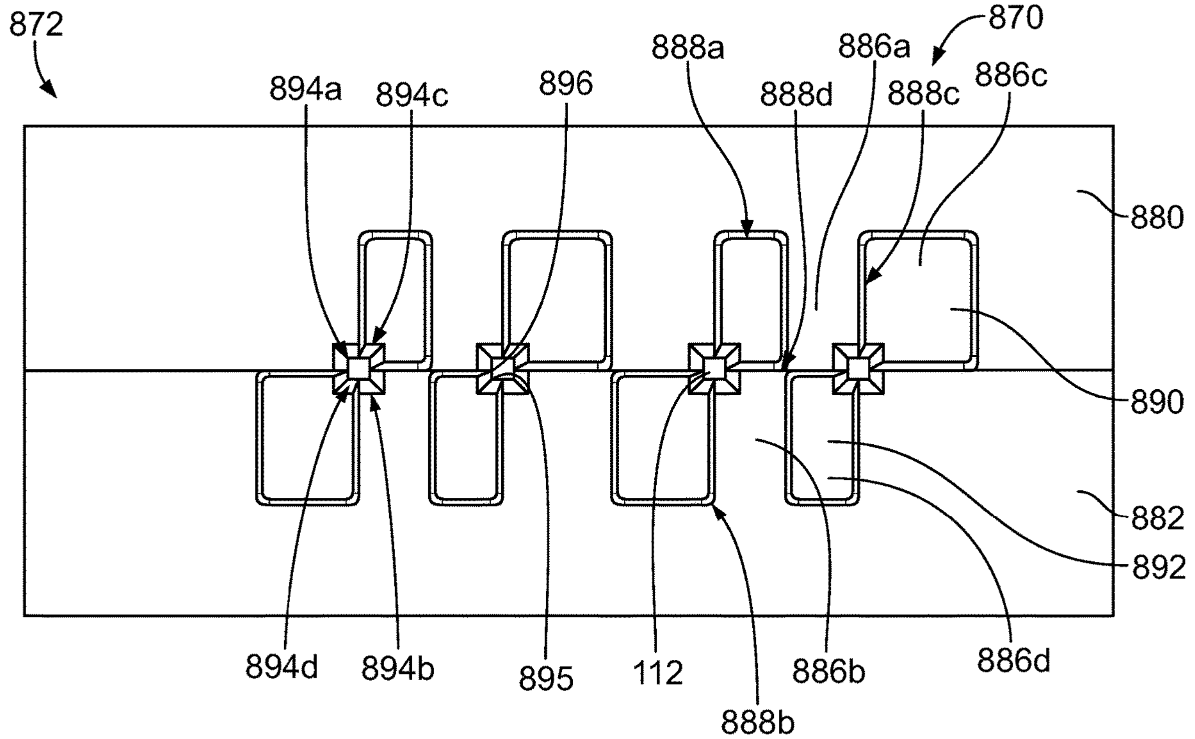
FIG. 17 is a cross sectional view of the wire guide assembly in accordance with an exemplary embodiment.

FIG. 17 is a cross sectional view of the wire guide assembly 870 in accordance with an exemplary embodiment. The wire guide assembly 870 includes the upper and lower rear guide elements 880, 882 and the upper and lower front guide elements 890, 892. The rails 886*a* of the upper rear guide element 880 are received in the slots 888*c* of the upper front guide element 890. The rails 886*c* of the upper front guide element 890 are received in the slots 888*a* of the upper rear guide element 880. The rails 886*b* of the lower rear guide element 882 are received in the slots 888*d* of the lower front guide element 892. The rails 886*d* of the lower front guide element 892 are received in the slots 888*b* of the lower rear guide element 882.

The wire channels 894*a*, 894*b*, 894*c*, 894*d* of the upper and lower rear guide elements 880, 882 and the upper and lower front guide elements 890, 892, respectively, cooperate to hold the wires 112. The wires 112 are supported by the horizontal and vertical surfaces 895, 896 of the upper and lower rear guide elements 880, 882 and the upper and lower front guide elements 890, 892. For examples, the corners of the square-shaped wires 112 are located in the corners of the upper and lower rear guide elements 880, 882 and the upper and lower front guide elements 890, 892. The upper and lower rear guide elements 880, 882 and the upper and lower front guide elements 890, 892 guide the wires 112 and resist horizontal and vertical movement of the wires 112.

The wire guide assembly 870 is designed such that the wires 112 may be wholly supported just using the two of the guide elements 880, 882, 890, 892 supporting opposite corners (for example, NE and SW or NW and SE). For example, when the wire guide assembly 870 is expanded (for example, the rear guide member 872 is moved away from the front guide member 874), the wires 112 may only be supported at two corners rather than all four corners along lengths of the wires 112. The wire guide assembly 870 provides support while still allowing relative movement between the parts.

Figure 18:
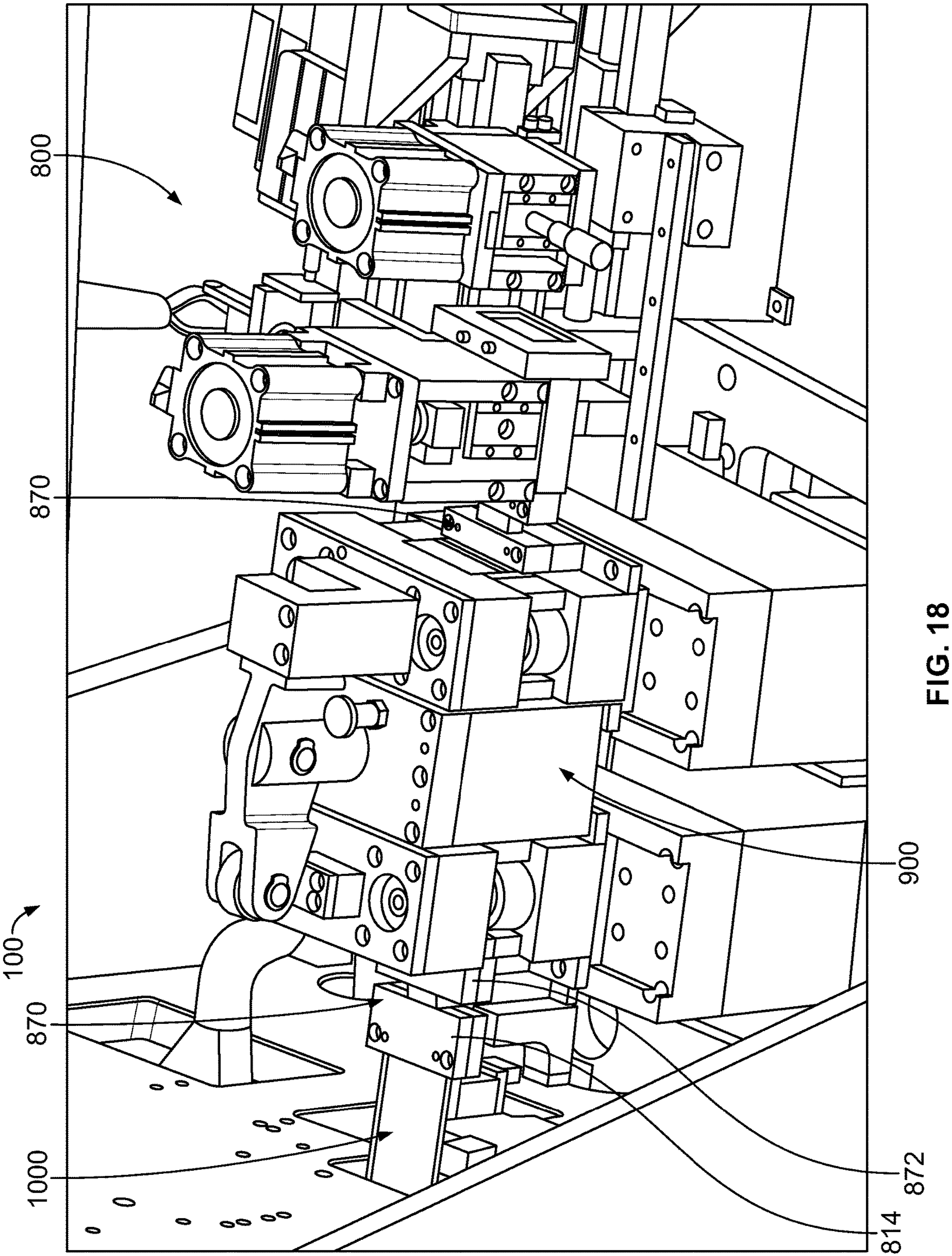
FIG. 18 is a perspective view of a portion of the electrical connector assembling machine showing the contact loading device in accordance with an exemplary embodiment.

FIG. 18 is a perspective view of a portion of the electrical connector assembling machine 100 showing the contact loading device 1000 in accordance with an exemplary embodiment. The contact loading device 1000 is downstream of the wire feed unit 800 and the contact forming unit 900. The contacts 106 are separated from the wires 112 by the contact forming unit 900 and indexed to the contact loading device 1000. The wire guide assembly 870 guides the contacts 106 from the contact forming unit 900 to the contact loading device 1000. For example, the rear guide member 872 is coupled to the contact forming unit 900 and the front guide member 874 is coupled to the contact loading device 1000. The wire guide assembly 870 is expandable to accommodate relative movement between the contact forming unit 900 and the contact loading device 1000.

The contact loading device 1000 positions the contacts 106 for loading into the connector strip 110 as the connector strip 110 is indexed through the electrical connector assembling machine 100. The contacts 106 are fed or loaded into the connector strip 110 by the contact loading device 1000. In an exemplary embodiment, the four wires 112 form four different sets of the contacts 106, which are simultaneously fed into the connector strip 110. Once the contacts 106 are loaded into the connector strip 110, lengths of the loaded connector strip 110, with the contacts 106, may be separated from the connector strip 110 to form the electrical connectors 102. Different length electrical connectors 102 may be manufactured by the electrical connector assembling machine 100 by varying the length of the connector strip 110 that is separated from the connector strip 110. The electrical connectors 102 may be transported or loaded to another machine or container for further processing and/or assembly to a circuit board and/or shipping.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector assembling machine for assembling an electrical connector including a connector housing manufactured from a connector strip that is a continuous extruded dielectric material and contacts manufactured from continuous wires, the electrical connector assembling machine comprising:

a connector strip feed unit including a connector strip feed track receiving the connector strip, the connector strip feed unit including a connector strip feeding device configured to index the connector strip through the connector strip feed track in successive feed strokes; and a contact loading assembly adjacent the connector strip feed track to load contacts in the connector strip, the contact loading assembly comprising:

a wire distribution unit including reel cradles for holding reels of the wires;

a wire feed unit including feed tracks receiving the wires from the reels at the wire distribution unit, the wire feed unit including a feeding device configured to simultaneously index the wires through the corresponding feed tracks in successive feed strokes, the feeding device including a holding device and an indexing device movable relative to the holding device to move the wires, the feeding device including an indexer operably coupled to the indexing device, the indexer moving the indexing device relative to the holding device from a retracted position to an advanced position, the indexing device moving the wires as the indexing device is moved from the retracted position to the advanced position, the indexing device moving relative to the wires as the indexing device is returned from the advanced position to the retracted position, the wire feed unit including a wire guide assembly guiding the wires through the wire feed unit, the wire guide assembly including a rear guide member and a front guide member adjacent the rear guide member, the rear and front guide members being overlapping to form wire channels receiving the corresponding wires, the wire channels forming part of the feed tracks, at least one of the rear guide member and the front guide member being movable relative to the wires as the feeding device indexes the wires through the wire feed unit;

a contact forming unit receiving the wires from the wire feed unit, the contact forming unit having a forming die pressed into the wires to form tapered ends of the contacts from the wires, the contact forming unit having a wire cutter for separating the contacts from the wires;

a first wire clamp coupled to the holding device and positioned adjacent the contact forming die, the first wire clamp having wire channels receiving the corresponding wires, the first wire clamp having support surfaces defining the wire channels, the support surfaces engaging the wires at supported segments of the wires to resist shape changes of the wires at the supported segments when the forming die presses the wires to form the tapered ends of the contacts from the wires;

a second wire clamp coupled to the indexing device and positioned adjacent the contact forming die, the second wire clamp having wire channels receiving the corresponding wires, the second wire clamp having support surfaces defining the wire channels, the support surfaces engaging the wires at supported segments of the wires to resist shape changes of the wires at the supported segments when the forming die presses the wires to form the tapered ends of the contacts from the wires; and a contact loading device loading the contacts made from the wires into the connector strip as the connector strip is advanced through the electrical connector assembling machine.

2. The electrical connector assembling machine of claim 1, wherein the first wire clamp includes multiple clamp elements engaging different segments of the wires and the second wire clamp includes multiple clamp elements engaging different segments of the wires.

3. The electrical connector assembling machine of claim 1, wherein the second wire clamp is in a clamping position as the indexing device is moved from the retracted position to the advanced position and is in a released position as the indexing device is moved from the advanced position to the retracted position, and wherein the first wire clamp is in a released position as the indexing device is moved from the retracted position to the advanced position and is in a clamping position as the indexing device is moved from the advanced position to the retracted position.

4. The electrical connector assembling machine of claim 1, wherein the indexer includes a carriage slidable along a feed rail, the indexing device being carried by the carriage and movable with the carriage as the carriage slides along the feed rail.

5. The electrical connector assembling machine of claim 1, wherein the first and second wire clamps are movable relative to the wires between engaged positions and disengaged positions, the support surfaces engaging the wires in the engaged positions, the first wire clamp being disengaged from the wires in the disengaged positions to allow the wires to index through the wire distribution unit.

6. The electrical connector assembling machine of claim 1, wherein the rear guide member engages and supports two sides of the wires and the front guide member engages and supports two sides of the wires different from the two sides of the wires supported by the rear guide member.

7. The electrical connector assembling machine of claim 1, wherein the rear guide member includes a rear block and rear rails extending forward from the rear block, the wire channels being formed through the rear block and the rear rails, the front guide member including a front block and front rails extending rearward from the front block, the rear rails being received in the front block, the front rails being received in the rear block, the wire channels being formed through the front block and the front rails.

8. An electrical connector assembling machine for assembling an electrical connector including a connector housing manufactured from a connector strip that is a continuous extruded dielectric material and contacts manufactured from continuous wires, the electrical connector assembling machine comprising:

a connector strip feed unit including a connector strip feed track receiving the connector strip, the connector strip feed unit including a connector strip feeding device configured to index the connector strip through the connector strip feed track in successive feed strokes; and a contact loading assembly adjacent the connector strip feed track to load contacts in the connector strip, the contact loading assembly comprising:

a wire distribution unit including reel cradles for holding reels of the wires;

a wire feed unit including feed tracks receiving the wires from the reels at the wire distribution unit, the wire feed unit including a feeding device configured to simultaneously index the wires through the corresponding feed tracks in successive feed strokes, the feeding device including a holding device having a holding wire clamp and an indexing device having an indexing wire clamp, the feeding device including an indexer operably coupled to the indexing device, the indexer moving the indexing device relative to the holding device from a retracted position to an advanced position, the indexing device moving the wires as the indexing device is moved from the retracted position to the advanced position, the indexing device moving relative to the wires as the indexing device is returned from the advanced position to the retracted position;

a contact forming unit receiving the wires from the wire feed unit, the contact forming unit having a forming die for forming ends of the contacts from the wires and a wire cutter for separating the contacts from the wires; and a contact loading device loading the contacts made from the wires into the connector strip as the connector strip is advanced through the electrical connector assembling machine.

9. The electrical connector assembling machine of claim 8, wherein the holding wire clamp includes wire channels receiving the corresponding wires when the holding wire clamp is in a clamping position, the holding wire clamp having support surfaces defining the wire channels, the support surfaces engaging the wires at supported segments of the wires to resist movement of the wires relative to the holding wire clamp, and wherein the indexing wire clamp includes wire channels receiving the corresponding wires when the indexing wire clamp is in a clamping position, the indexing wire clamp having support surfaces defining the wire channels, the support surfaces engaging the wires at supported segments of the wires to resist movement of the wires relative to the indexing wire clamp.

10. The electrical connector assembling machine of claim 8, wherein the holding wire clamp includes multiple clamp elements engaging different segments of the wires and the indexing wire clamp includes multiple clamp elements engaging different segments of the wires.

11. The electrical connector assembling machine of claim 8, wherein the indexing wire clamp is in a clamping position as the indexing device is moved from the retracted position to the advanced position and is in a released position as the indexing device is moved from the advanced position to the retracted position, and wherein the holding wire clamp is in a released position as the indexing device is moved from the retracted position to the advanced position and is in a clamping position as the indexing device is moved from the advanced position to the retracted position.

12. The electrical connector assembling machine of claim 8, wherein the indexing device includes an indexing actuator operably coupled to the indexing wire clamp, the indexing actuator operated to move the indexing wire clamp between a clamping position and a released position, and wherein the holding device includes a holding actuator operably coupled to the holding wire clamp, the holding actuator operated to move the holding wire clamp between a clamping position and a released position.

13. The electrical connector assembling machine of claim 8, wherein the indexer includes a carriage slidable along a feed rail, the indexing device being carried by the carriage and movable with the carriage as the carriage slides along the feed rail.

14. The electrical connector assembling machine of claim 8, wherein the indexer includes a motor, a ball screw driven by the motor, and a carriage operably coupled to the ball screw, the carriage being slidable along a feed rail, the indexing device being carried by the carriage and movable with the carriage as the carriage slides along the feed rail, wherein the motor is operated to drive the ball screw and move the carriage in a forward direction and a reverse direction to move the indexing device between the retracted position and the advanced position.

15. The electrical connector assembling machine of claim 8, wherein the indexing device is variably positionable relative to the holding device to control lengths of the contacts formed by the wire distribution unit.

16. The electrical connector assembling machine of claim 8, wherein the forming die is a first forming die, the contact forming unit including a second forming die, the first forming die forming tapered ends at the top and bottom surfaces of the wire, the second forming die forming tapered ends at opposite first and second side surfaces of the wire, the first forming die being coupled to the holding device, the second forming die being coupled to the indexing device and being movable with the indexing device.

17. An electrical connector assembling machine for assembling an electrical connector including a connector housing manufactured from a connector strip that is a continuous extruded dielectric material and contacts manufactured from continuous wires, the electrical connector assembling machine comprising:

- a connector strip feed unit including a connector strip feed track receiving the connector strip, the connector strip feed unit including a connector strip feeding device configured to index the connector strip through the connector strip feed track in successive feed strokes; and
- a contact loading assembly adjacent the connector strip feed track to load contacts in the connector strip, the contact loading assembly comprising:
- a wire distribution unit including reel cradles for holding reels of the wires;
- a wire feed unit including feed tracks receiving the wires from the reels at the wire distribution unit, the wire feed unit including a feeding device configured to simultaneously index the wires through the corresponding feed tracks in successive feed strokes;
- a contact forming unit receiving the wires from the wire feed unit, the contact forming unit having a forming die pressed into the wires to form tapered ends of the contacts from the wires, the contact forming unit having a wire cutter for separating the contacts from the wires;
- a wire clamp positioned adjacent the contact forming die, the wire clamp having wire channels receiving the corresponding wires, the wire clamp having support surfaces defining the wire channels, the support surfaces engaging the wires at supported segments of the wires to resist shape changes of the wires at the supported segments when the forming die presses the wires to form the tapered ends of the contacts from the wires; and
- a contact loading device loading the contacts made from the wires into the connector strip as the connector strip is advanced through the electrical connector assembling machine.

18. The electrical connector assembling machine of claim 17, wherein the wire clamp is movable relative to the wires between an engaged position and a disengaged position, the support surfaces engaging the wires in the engaged position, the wire clamp being disengaged from the wires in the dis engaged position to allow the wires to index through the wire distribution unit.

19. The electrical connector assembling machine of claim 17, wherein the wire channels are trapezoid shaped to receive the wire.

20. The electrical connector assembling machine of claim 17, wherein the wire channels include tapered lead-in surfaces to guide the wires into the wire channels.

21. The electrical connector assembling machine of claim 17, wherein the wire clamp is a first wire clamp, the contact forming unit including a second wire clamp having wire channels receiving the corresponding wires, the first wire clamp being located rearward of the forming die, the second wire clamp being located forward of the forming die.

22. The electrical connector assembling machine of claim 17, wherein the wire clamp is coupled to the feeding device to index the wires.

23. An electrical connector assembling machine for assembling an electrical connector including a connector housing manufactured from a connector strip that is a continuous extruded dielectric material and contacts manufactured from continuous wires, the electrical connector assembling machine comprising:

- a connector strip feed unit including a connector strip feed track receiving the connector strip, the connector strip feed unit including a connector strip feeding device configured to index the connector strip through the connector strip feed track in successive feed strokes; and
- a contact loading assembly adjacent the connector strip feed track to load contacts in the connector strip, the contact loading assembly comprising:
- a wire distribution unit including reel cradles for holding reels of the wires;
- a wire feed unit including feed tracks receiving the wires from the reels at the wire distribution unit, the wire feed unit including a feeding device configured to simultaneously index the wires through the corresponding feed tracks in successive feed strokes, the wire feed unit including a wire guide assembly guiding the wires through the wire feed unit, the wire guide assembly including a rear guide member and a front guide member adjacent the rear guide member, the rear and front guide members being overlapping to form wire channels receiving the corresponding wires, at least one of the rear guide member and the front guide member being movable relative to the wires as the feeding device indexes the wires through the wire feed unit;

a contact forming unit receiving the wires from the wire feed unit, the contact forming unit having a forming die pressed into the wires to form tapered ends of the contacts from the wires, the contact forming unit having a wire cutter for separating the contacts from the wires; and a contact loading device loading the contacts made from the wires into the connector strip as the connector strip is advanced through the electrical connector assembling machine.

24. The electrical connector assembling machine of claim 23, wherein the rear guide member engages and supports two sides of the wires and the front guide member engages and supports two sides of the wires different from the two sides of the wires supported by the rear guide member.

25. The electrical connector assembling machine of claim 23, wherein the rear guide member includes first and second rear support surfaces meeting at a rear corner and the front guide member includes first and second front support surfaces meeting at a front corner, the rear corner and the front corner receiving opposite corners of the wire.

26. The electrical connector assembling machine of claim 23, wherein the rear and front guide members form square shaped wire channels.

27. The electrical connector assembling machine of claim 23, wherein the rear guide member includes a rear block and rear rails extending forward from the rear block, the wire channels being formed through the rear block and the rear rails, the front guide member including a front block and front rails extending rearward from the front block, the rear rails being received in the front block, the front rails being received in the rear block, the wire channels being formed through the front block and the front rails.

* * * * *